United States Patent [19]

Sakamoto et al.

[11] Patent Number: 4,905,025
[45] Date of Patent: Feb. 27, 1990

[54] METHOD OF AND APPARATUS FOR RECORDING IMAGE ON PHOTOSENSITIVE MATERIAL WITH A PLURALITY OF PHOTOBEAMS

[75] Inventors: Takashi Sakamoto; Masafumi Kawatani; Kazutaka Tasaka; Masahide Okazaki, all of Kyoto, Japan

[73] Assignee: Dainippon Screen Mfg. Co., Ltd., Japan

[21] Appl. No.: 367,466

[22] Filed: Jun. 16, 1989

[30] Foreign Application Priority Data

Jun. 20, 1988 [JP] Japan .............................. 63-152901
Jun. 20, 1988 [JP] Japan .............................. 63-152902
Feb. 10, 1989 [JP] Japan .............................. 64-32499

[51] Int. Cl.$^4$ ............................................. G01D 15/00
[52] U.S. Cl. ..................................... 346/154; 346/160
[58] Field of Search ................... 346/154, 160, 107 R, 346/108; 358/300, 302; 364/518, 514

[56] References Cited

U.S. PATENT DOCUMENTS 4,754,291  6/1988  Horikawa ............................ 346/160
4,786,923  11/1988  Shimizu ............................ 346/154

OTHER PUBLICATIONS

Tooru Matsuoka, "Guide for Application of Lasers", Chapter 4, pp. 157-158, (1982).

Primary Examiner—Arthur G. Evans
Attorney, Agent, or Firm—Ostrolenk, Faber, Gerb & Soffen

[57] ABSTRACT

A photosensitive film is scanned with nine laser beams for recording an image on the same. The subscanning pitch $\Delta X_1$ is so determined as to be 4.5 P, where P is an alignment pitch of photospots formed by the laser beams. Scanning lines which belong to a "front line group" and are scanned in a main scanning are spatialy alternated with other scanning lines which belong to a "rear line group" and are scanned in the next main scanning.

23 Claims, 15 Drawing Sheets

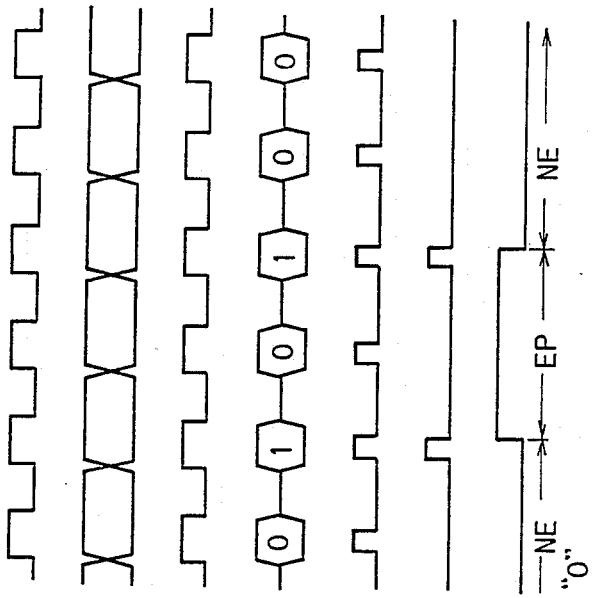
FIG. 6A  ROTATION TIMING PULSES : PT
FIG. 6B  ADDRESS SIGNAL : ADR
FIG. 6C  R/W̄ SIGNAL
FIG. 6D  CROSS POINT DATA BEING OUTPUTTED
FIG. 6E  TIMING SIGNAL : ST
FIG. 6F  INPUT OF FLIP-FLOP
FIG. 6G  DOT DATA : DD
FIG. 6H  INPUT OF LINE MEMORIES
EP = EXPOSE.  NE = NON-EXPOSE

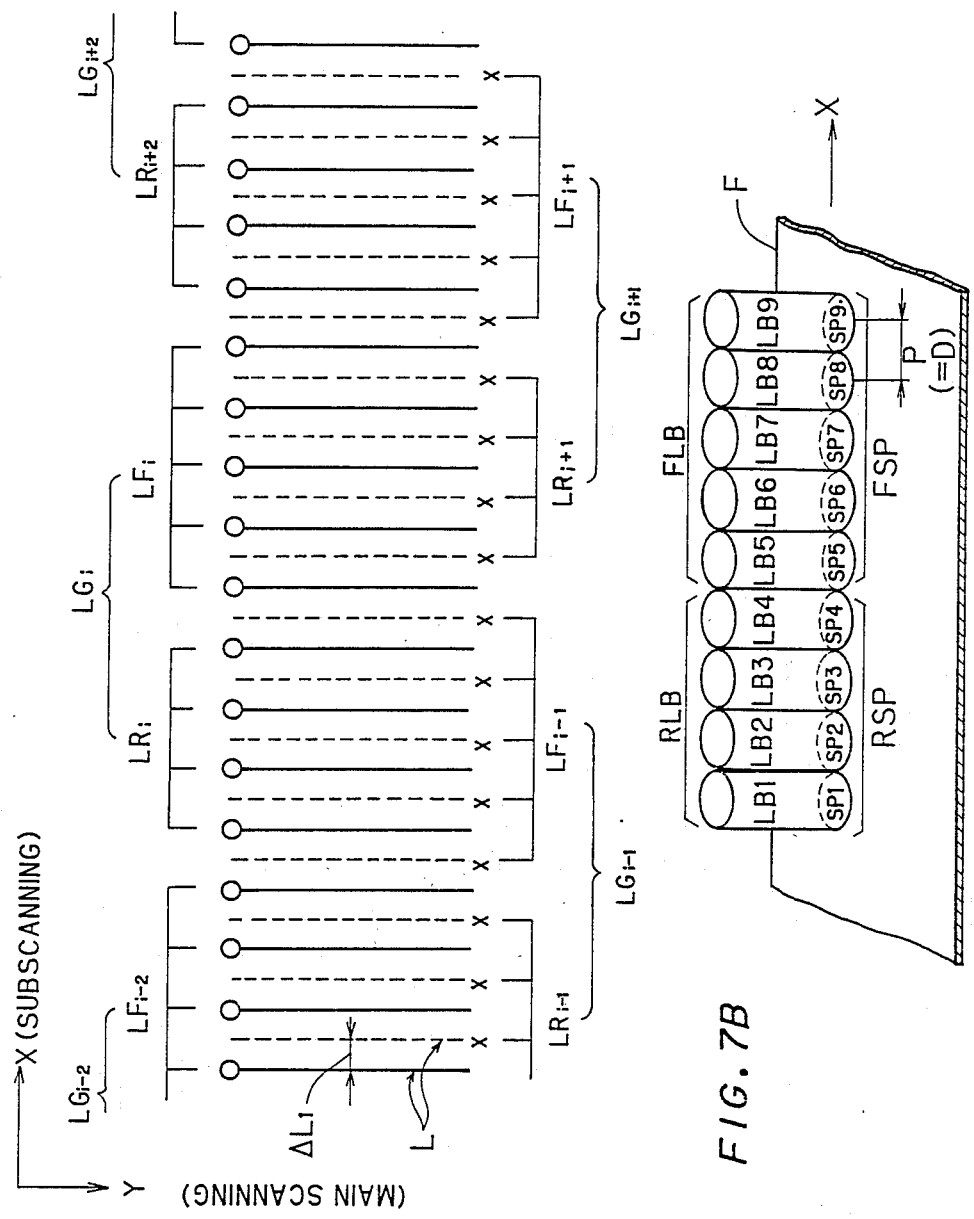

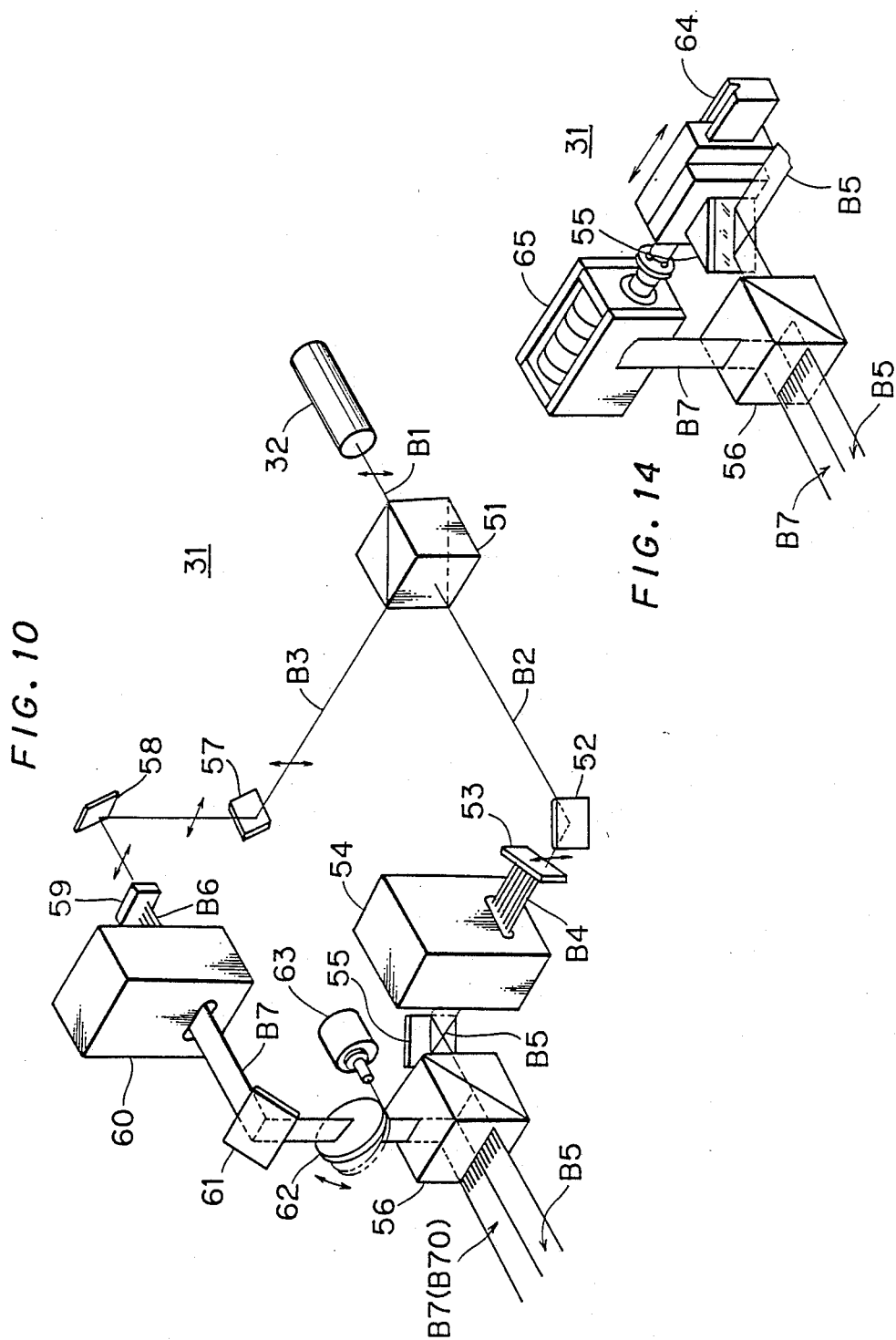

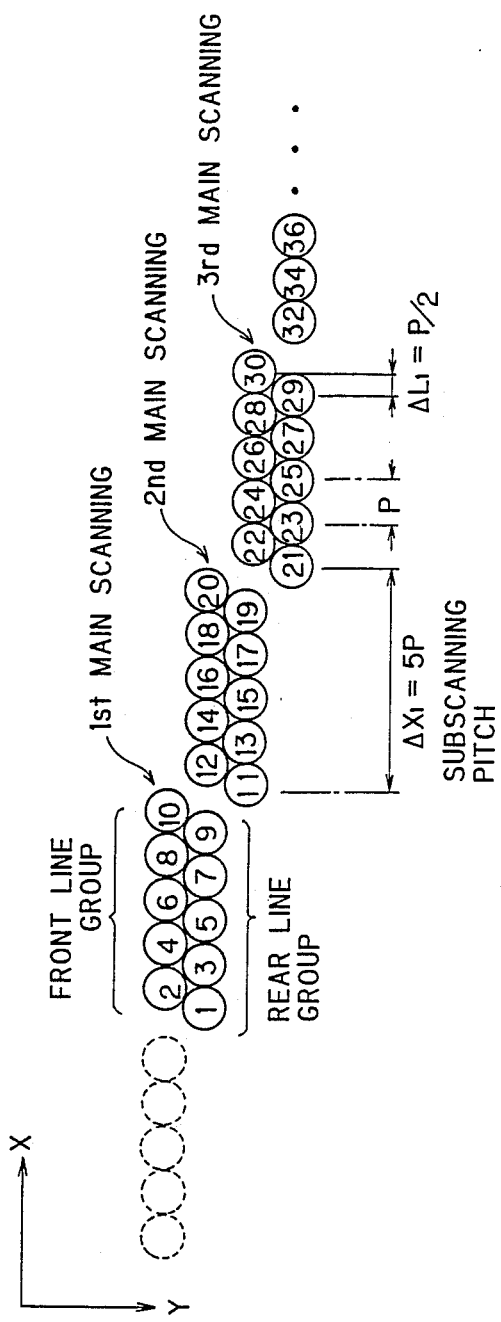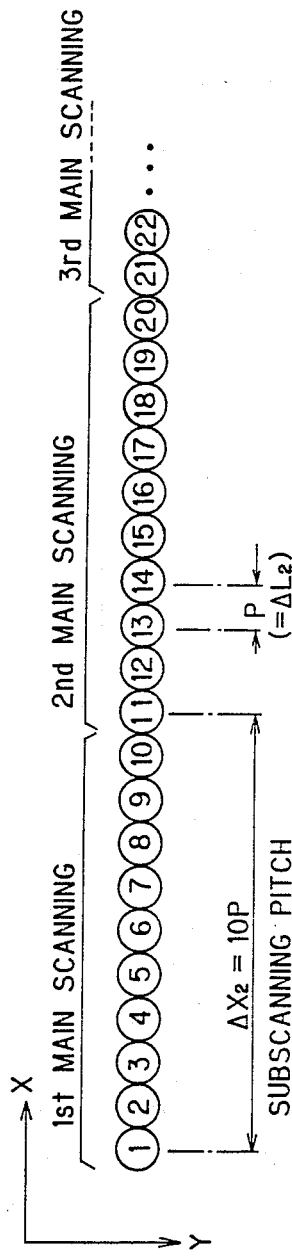

METHOD OF AND APPARATUS FOR RECORDING IMAGE ON PHOTOSENSITIVE MATERIAL WITH A PLURALITY OF PHOTOBEAMS

BACKGROUND OF THE INVENTION

1. Field of the Invention

The present invention relates to a method of and apparatus for recording an image on a photosensitive material which are available in laser plotters, process scanners laser plotters and other image scan recorders, and more particularly to an improvement in recording the image by scanning a photosensitive plane in parallel by means of a plurality of photobeams or multibeams.

2. Description of the Prior Arts

In a laser plotter for recording a wiring pattern on a photosensitive film to produce a master film for printed circuit boards, for example, the photosensitive film is scanned with laser beams which are modulated by image signals expressing the wiring pattern. FIG. 19 shows a schematic construction of a laser plotter, which comprises an image data generator 110, a data converter 120 and an image recorder 130. Graphic figures representing a wiring pattern are produced with a CAD system, and vector data VD expressing the contour lines of the graphic figures are generated in the image data generator 110. The vector data VD are then transmitted to the data converter 120 to be converted into dot image data. The image recorder 130 has a laser unit 131 generating a plurality of laser beams or multibeams LB, and the multibeams LB are modulated into ON/OFF binary multibeams in accordance with the dot image data for each pixel.

A photosensitive film F is wounded around a recording drum 132 which is rotated in a direction $\phi$. When the modulated multibeams LB are supplied onto the photosensitive film F while moving the multibeams LB in a direction X, the photosensitive film F is scanned with the modulated multibeams LB through a combination of main scannings by the rotation $\phi$ and a subscanning by the linear movement in the direction X. Since a plurality of scanning lines are scanned in parallel by means of the multibeams LB, respective line images corresponding to the plurality of scanning lines are recorded in parallel at a strip region on the photosensitive film F. The whole of the wiring pattern is obtained on the photosensitive film F strip by strip by repeating the main scanning while moving the multibeams LB in the subscanning direction X. The image recording using the multibeams LB is superior to that using only a single photobeam in recording speed of the whole image.

FIG. 20 is a diagram showing a photospot array which is formed on the photosensitive film F by the multibeams LB. The photospot array will be visible only after the photosensitive film F is developed, and consists of five photospots BS being aligned in the subscanning direction X which is perpendicular to the main scanning direction Y. Although the image recording using the multibeams LB is preferred for a high speed recording, two problems are caused when the photospots BS are aligned at an alignment pitch being equal to the diameter of each photospot, as shown in FIG. 20. One of them is that respective line images on the neighboring scanning lines are not smoothly connected since the intensity distribution of each photospot drastically falls at the edge of the photospot in accordance with a gaussian distribution function, and exposure at the edge portion is often unsufficient for effective recording. The other problem is that the quality of the recorded image is hardly increased because rough steps appear at a boundary between an exposed region and an unexposed region, as shown in FIG. 21.

In order to solve the problems, the following improvements have been developed.

(1) In the first improvement, the laser beams are so arranged that the photospots BS partially overlap each other, as shown in FIG. 22. To avoid interference between overlapped coherent laser beams, the respective polarizations of neighboring beams are orthogonalized to each other. The overlap of the photospots compensate the lack of exposure in the edge of the photospots, and the boundary between the exposed and unexposed regions becomes fine steps as shown in FIG. 23.

(2) In the second improvement, partially overlapped photobeams are supplied on to the photosensitive film F through respective light paths whose difference is larger than the coherent length of the laser beams.

(3) In the third improvement, the photospots are spatially staggered in the main scanning direction Y, as shown in FIG. 24. Respective timings in modulating the laser beams are alternately changed for compensating the spatial stagger of the photospots BS. Respective traces of the neighboring photospots are also overlapped with each other, and the recorded image shown in FIG. 23 is obtained similarly to the improvements (1) and (2).

(4) In the fourth improvement, respective laser beams are individually generated by means of a plurality of laser oscillators. Respective traces of the neighboring beams are partially overlapped with each other similarly to the improvements (1) through (3).

Although the two problems in the alignment of FIG. 20 are solved by either of the improvements, respective new problems are caused. That is, the first improvement has a disadvantage in that additional optical means for rotating polarization by 90 degrees, a quarter wavelength plate, for example, is required and an optical system becomes complicated. A disadvantage of the second improvement is that at least one of the light paths must be very long whereby the optical system often goes out of its regular arrangement when the optical system is mechanically vibrated by an external force, even if the degree of vibration is small. The staggered arrangement of the photospots in the third improvement requires a circuit for adjusting the modulation timings of respective laser beams, so that the circuit structure in the image recorder becomes complicated. Furthermore, the fourth improvement causes a problem in that the cost for fabricating the image recorder and the complexity of the structure are increased because two or more laser oscillators must be provided. Therefore, an improvement for solving the two problems without these new problems is being required in the field of image recording.

Furthermore, employment of the partially overlapped laser beams cases another problem that the recording speed is decreased due to increase of scanning lines in density. This problem cannot be solved as long as the lase beams are partially overlapped with each other, and it is unreasonable to employ the overlapped beams when image quality in high resolution is not required.

SUMMARY OF THE INVENTION

The present invention is intended for a method of recording an image on a photosensitive material through a scan of the photosensitive material with a plurality of modulated photobeams wherein the scan is conducted along a sequence of main scannings, each of the main scannings being conducted with the plurality of modulated photobeams in a main scanning direction, the sequence being directed in a subscanning direction.

According to the present invention, the method comprises the steps of: (a) generating image signals expressing the image for each scanning line, (b) modulating a plurality of photobeams with the image signals to generate a plurality of modulated photobeams which form a plurality of photospots substantially aligned on the photosensitive material in the subscanning direction, wherein the plurality of modulated photobeams are classified into front photobeams existing in a side to which subscanning is to be advanced and rear photobeams existing in another side opposite to the side, and (c) scanning the photosensitive material with the plurality of modulated photobeams along the sequence of the main scannings while relatively moving the photosensitive material and the plurality of modulated photobeams in the subscanning direction so that scanning lines which are scanned with the front photobeams in a main scanning are positionally alternated with other scanning lines which are scanned with the rear photobeams in another main scanning which follows the main scanning in the sequence.

The present invention can be applied to image recording in both cases where number N of photobeams is an odd integer and an even integer, respectively.

When the number N is an odd integer, the N photospots are aligned at an alignment pitch P being substantially equal to $2\Delta L$ where $\Delta L$ is a pitch at which scanning lines are arrayed, and the step (e) includes the step of: (e-1) determining the subscanning pitch $\Delta X$ so as to substantially satisfy the following equation (Eq. 1):

$$\Delta X = P \cdot N/2 \tag{Eq.1}$$

On the other hand, when N is an even integer, N/2 front photospots and N/2 rear photospots are formed by the front photobeams and the rear photobeams, respectively. The N/2 front photospots are aligned at an alignment pitch P being substantially equal to $2\Delta L$, and the N/2 rear photospots are also aligned at the alignment pitch P.

A distance between respective centers of two photospots neighboring across a boundary gap between the N/2 front photospots and the N/2 rear photospots is set at 1.5P, and the step (e) includes the step of: (e-2) determining the subscanning pitch $\Delta X$ so as to substantially satisfy the above-indicated equation (Eq. 1).

Preferably, the subscanning pitch $\Delta X$ is varied according to a required quality or line pitch in a recorded image. When the line pitch is a fine pitch, the subscanning pitch $\Delta X$ is determined according to the above-indicated equation. If the line pitch is a normal pitch, the subscanning pitch $\Delta X$ is set at $P \cdot N$. Under the condition where the alignment pitch P is substantially equal to the diameter of each photospot, the image recording in the fine pitch is an overlap recording in which respective traces of neighboring photospots are partially overlapped, while that in the normal pitch is an unoverlap recording.

The present invention also provides an apparatus suitable for recording an image according to the above-indicated method.

In the present invention, neighboring scanning lines are scanned at different timings, and optical interference between laser beams is prevented without a complex mechanism. A complicated circuit for adjusting the modulation timings of respective laser beams is not also required because staggered array of laser beams is not employed. By switching the subscanning pitch to larger one, a high speed recording is attained for the normal line pitch.

Accordingly, an object of the present invention is to attain fine pitch scannings without complex mechanism for preventing interference between photobeams.

Another object is to avoid the interference in fine pitch recording by relatively shifting respective timings at which neighboring scanning lines are scanned.

Another object is to provide a construction for selecting an optimum recording mode for a designated line pitch or recording quality.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A through 6H are timing charts showing respective signals used for generating a dot data, FIG. 7A is an explanatory diagram showing an array of scanning lines and classification of the scanning lines, FIG. 7B is a schematic perspective view of the laser beams showing classification of the laser beams, FIGS. 8A through 8D are explanatory diagrams showing line data stored in the buffer memory circuit 23 at respective stages of image recording in an overlap mode, FIG. 10 is a perspective view showing the internal structure of the recording head 31 according to a second preferred embodiment, FIG 14 is a perspective view showing characteristic structure in another example of the recording head 31, FIG. 16A shows positional relationship between respective scanning lines which are scanned in the overlap mode, where the number N of laser beams is ten, FIGS. 17 and 18 show alignments of photobeams which are selectively employed for image recording, FIG. 19 block diagram showing the basic structure of image recorders using multibeams.

DESCRIPTION OF THE PREFERRED EMBODIMENTS

A. First Preferred Embodiment

The first preferred embodiment is directed to an image recorder generating an odd number of laser beams. When the number of the laser beams is N (N= an odd integer) and an alignment pitch of photospots on a photosensitive material is P, the photosensitive material is scanned with the laser beams at a subscanning pitch $\Delta X$, which is substantially equal to $(P \cdot N/2)$ for a fine pitch recording and $(P \cdot N)$ for a normal pitch recording (a high speed recording). Details of the first preferred embodiment will be described in the case where N=9.

(A-1) Construction of Image Recorder

Figure 1:
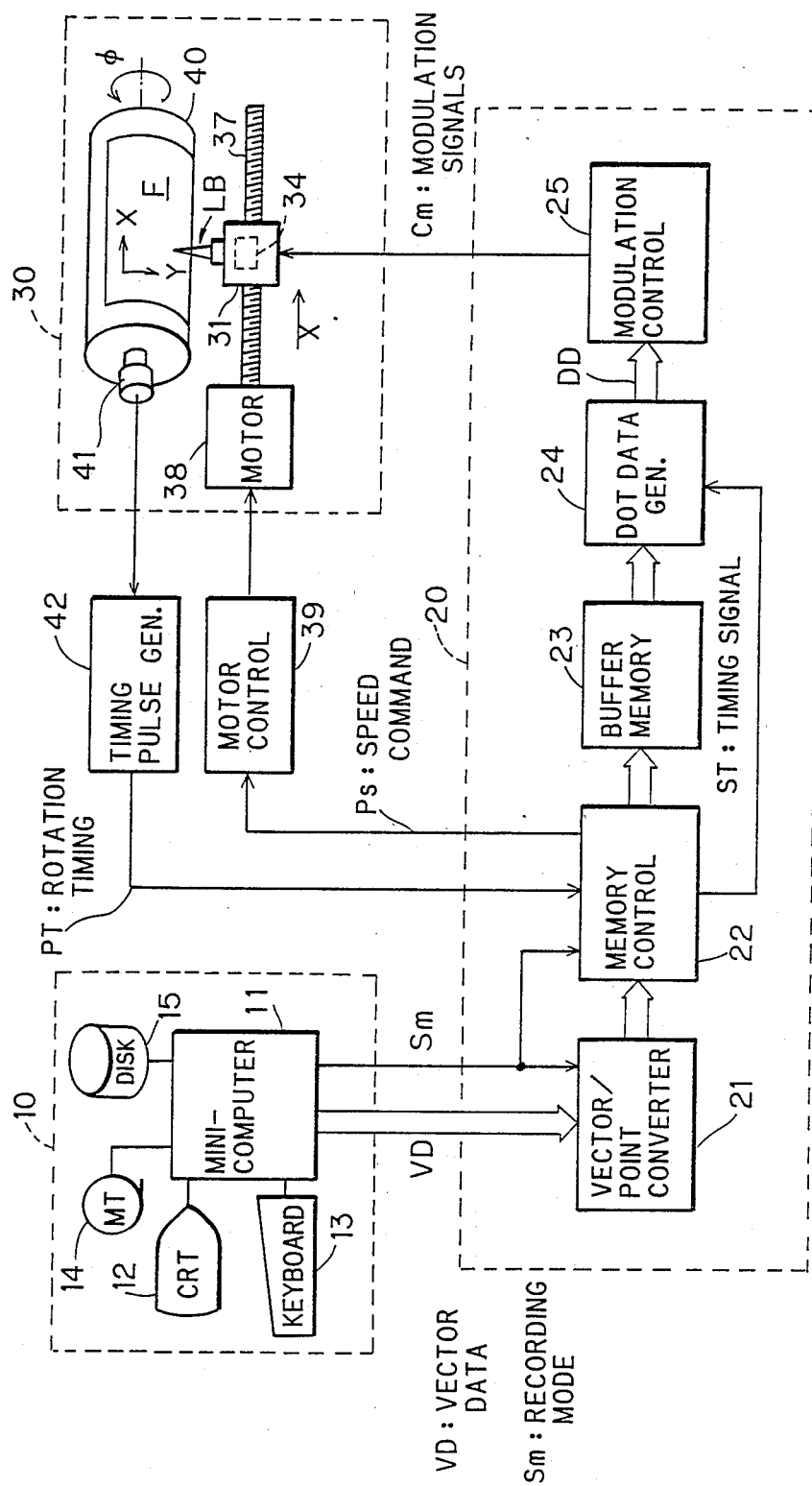
FIG. 1 is a block diagram showing an image recorder according to a first preferred embodiment.

FIG. 1 is a block diagram showing the image recorder according to the first preferred embodiment of the present invention, which is constructed as a laser plotter. The laser plotter comprises an image data generator 10, a data converter 20 and a recording unit 30. The image data generator 10 has a minicomputer 1, a CRT 12 and a keyboard 13. In response to manual operation of the keyboard 13, the minicomputer 11 fetches CAD data from a magnetic tape 14 or a magnetic disk 15. The CAD data is previously prepared so as to express an image which is to be recorded. When the laser plotter is used to produce a master film for printed circuit boards, the image is expressed by graphic figures corresponding to a wiring pattern. The minicomputer 11 converts the CAD data into vector data VD expressing respective contour lines of the graphic figures.

The vector data VD is transmitted to a vector/point converter 21 which is provided in the data converter 20. The vector/point converter 21 converts the vector data VD into cross point data which expresses respective cross points of the contour vectors and each scanning line. The cross point data is delivered to a memory controller 22 for each scanning line, and is then stored in a buffer memory circuit 23 under read/write control by the memory controller 22.

Prior to the transmittance of the vector data VD to the vector/point converter 21, an operator selects a value of a scanning line pitch $\Delta L$ (not shown in FIG. 1) according to a recording plan of the image. When the recording plan requires a high quality recording at a fine pitch, the operator operates the keyboard 13 in order to designate "an overlap mode" in which neighboring laser beams are partially overlapped with each other in scan of a photosensitive material. on the other hand, when the recording plan requires normal quality recording at a normal or relatively rough pitch, designated by the operator is "an unoverlap mode" in which laser beams are aligned with out substantial overlap between them. In response to the selection, or designation, a recording mode signal Sm expressing the designated one mode is generated in the image data generator 10 to be transmitted to the vector/point converter 21 and the memory controller 22.

Figure 2:
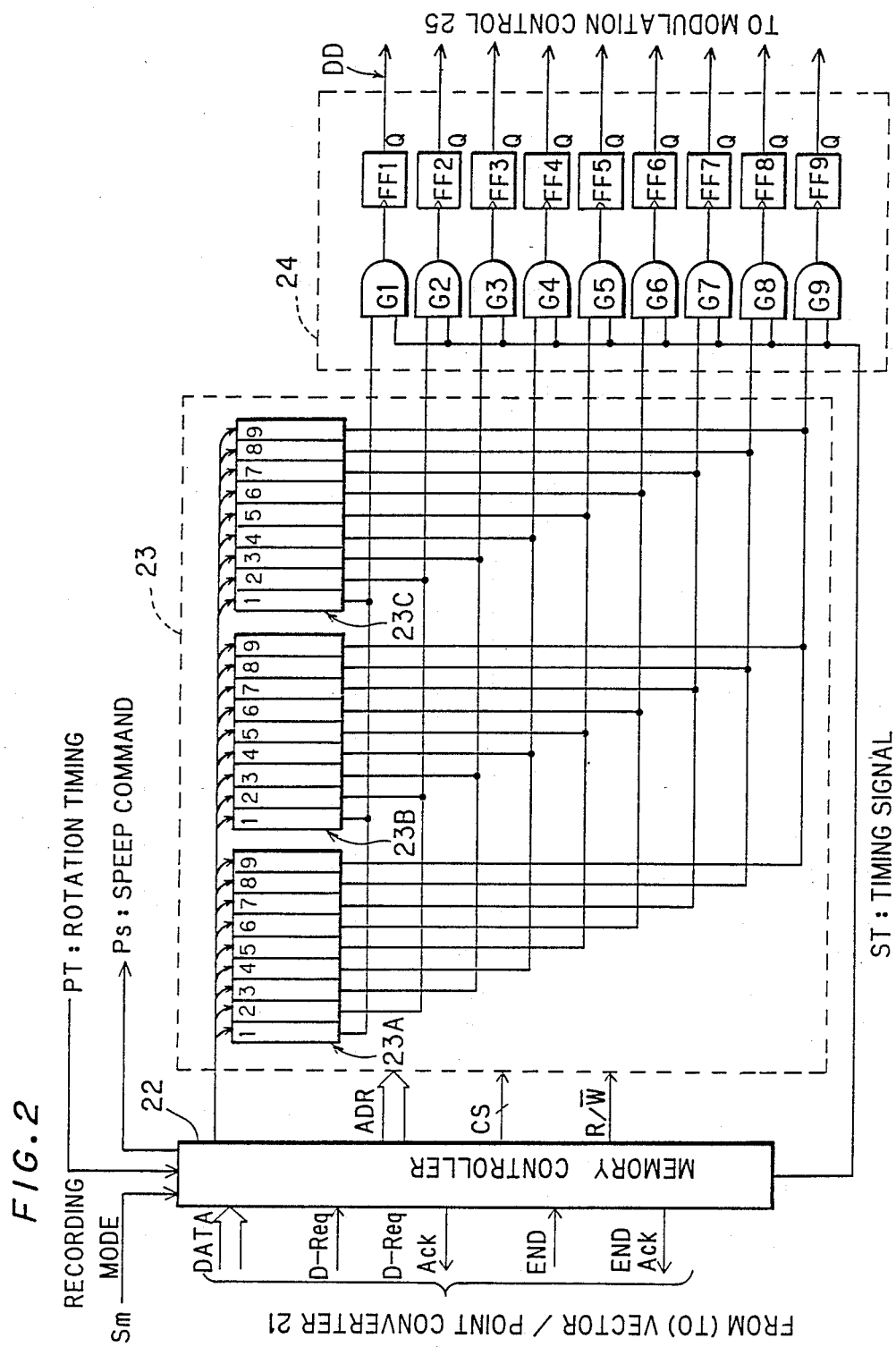
FIG. 2 is a circuit diagram showing a buffer memory circuit 23 and a dot data generator 24 in connection with a memory controller 22.

As shown in FIG. 2, the buffer memory circuit 23 comprises three buffer memories 23A, 23B and 23C which are individually controlled by the memory controller 22. Each of the buffer memories 23A, 23B and 23C has nine line memories corresponding to nine laser beams for the image recording. The nine line memories are indicated in FIG. 2 with numerals "1" through "9", and each of them has a storage area sufficient to store the cross point data or bit data corresponding to pixels included in each scanning line.

A dot data generator 24 is provided in the next stage of the buffer memory circuit 23 in order to convert the cross point data into dot data DD. The dot data generator 24 has nine AND gates G1-G9 and nine J-K flip-flops FF1-FF9 whose J and K terminals (not shown) are supplied with a "H" level voltage. The first input terminal of each AND gate G1-G9 is connected with the output terminal of the corresponding line memory, and a timing signal ST is supplied from the memory controller 22 to respective second input terminals of the AND gates G1-G9. Outputs of the gates G1-G9 are given to clock terminals of the flip-flops FF1-FF9, respectively. Timing control in the circuits 23 and 24 will be more fully described later.

A modulation controller 25 shown in FIG. 1 is operable to receive the dot data DD for nine scanning lines from the dot data generator 24 in parallel, to generate nine parallel modulation signals Cm. The nine parallel modulation signals Cm are delivered to the recording unit 30 in order to individually control an acoustic-optical modulator (AOM) 34 of nine channels in a binary mode of ON and OFF.

Construction of the recording unit 30 is as follows: The recording unit 30 has a recording drum 40 around which a photosensitive film F is wound. The recording drum 40 is rotated in a direction $\phi$ by means of a motor (not shown). The rotation speed is a constant, and the rotation angle is detected by a rotary encoder 41 attached to the rotation axis of the recording drum 40. In response to an output signal of the rotary encoder 41, a timing pulse generator 42 generates a rotation timing pulse PT for every rotation of the drum 40 by a predetermined angle. The rotation timing pulse PT is delivered to the memory controller 22.

In parallel to the rotation axis of the drum 40, a screw rod 37 is provided. A recording head 31 having the AOM 34 is coupled to the screw rod 37 through a nut, and is linearly moved in a direction X by rotating the screw rod 37 continuously or intermittently with a motor 38. When modulated laser beams LB, which will be described later, are supplied from the recording head 34 onto the photosensitive film F while rotating the drum 40 and the screw rod 47, an imaging area on the photosensitive film F is scanned with the modulated laser beams LB. As will be understood by those skilled in the art, the circumferential direction Y of the drum 40 corresponds to a main scanning direction on the photosensitive sheet F, while the direction X is a subscanning direction.

The rotation speed of the motor 38 is controlled by a control signal generated in a motor controller 39. In order to designate the rotation speed of the motor 38, speed command pulses P are generated in the memory controller 22 and are delivered to the motor controller 39. A "subscanning pitch" is defined as a distance by which the recording head 31 and the modulated laser beams LB proceed in the direction X for each rotation of the drum 40, i.e., for each main scanning of the photosensitive film F. Therefore, when the rod 37 is continuouslY rotated, the subscanning pitch ΔX (not shown in FIG. 1) can be expressed as follows;

$$\Delta X = K \cdot V_R / V_D \tag{1}$$

where
- $K$ = the screw pitch of the screw rod 37 (constant),
- $V_R$ the rotation speed of the screw rod 37 in r.p.m., and
- $V_D$ = the constant rotation speed of the drum 40 in r.p.m.

In other words, the rotation speed of the motor 38 is determined so that the value of the speed $V_R$ gives a designated subscanning pitch ΔX through the equation (1).

Figure 3:
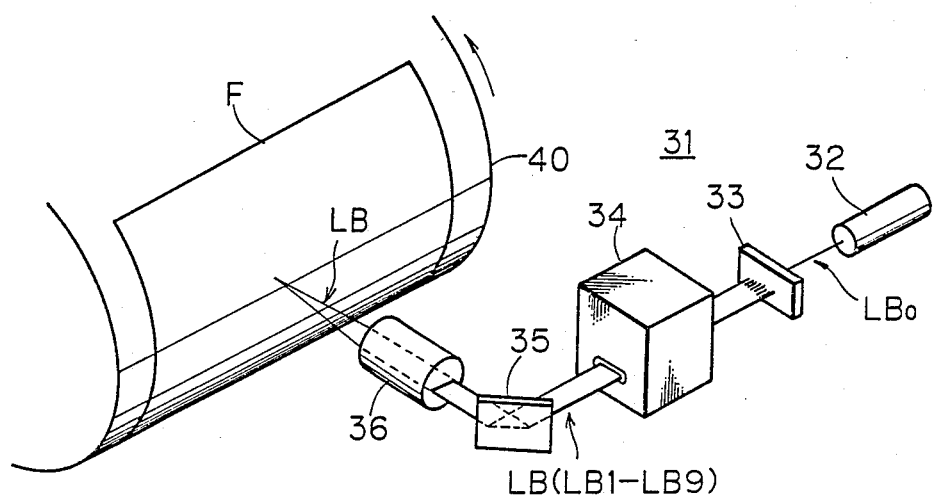
FIG. 3 is a perspective view showing the internal structure of a recording head 31.

FIG. 3 shows the inner structure of the recording head 31. A laser osillator 32 emits a laser beam $LB_O$, which is divided into nine laser beams by a beam divider 33. The nine laser beams are supplied to the AOM 34 of nine channels to be individually modulated therein in accordance with the dot data for nine scanning lines. The modulation is ON/OFF modulation, and the modulated nine laser beams LB (LB1–LB9) are obtained in parallel. The modulated laser beams LB are reflected by a mirror 35, and are then supplied to a lens system 36 to be individually focused on the photosensitive film F.

Figure 4:
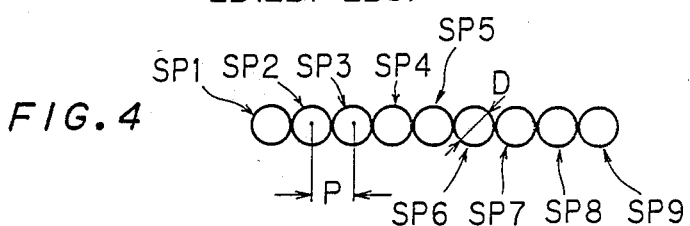
FIG. 4 is an alignment of photospots SP1–SP9 having an alignment pitch P.

FIG. 4 shows an alignment of photospots SP1–SP9 on the photosensitive film F, which photospots are formed by the laser beams or multibeams LB. Each of the photospots SP1–SP9 has a common diameter D, and the photospots SP1–SP9 are aligned at an alignment pitch P being equal to the diameter D. When intensity distribution of each laser beam in section is a gaussian distribution, the diameter D is defined so that the light intensity on the circle having the diameter D is $(1/e^2)$ times the light intensity at the center point of the circle, where "e" is the base of natural logarithm and $(1/e^2)$ is estimated as about 13.5%. Since the light intensity on the circle is considerably small as compared with the light intensity at the center point, interference between the laser beams neighboring each other at the distance P=D is substantially prevented. In other words, the alignment pitch P is determined so that neighboring laser beams do not substantially interfere with each other. The condition is also held in other preferred embodiments which will be described later.

(A-2) Operation Common to Both Modes

Described in this section is an operation for writing and reading the cross point data at the buffer memory circuit 23. Operations characteristic of the overlap mode and the unoverlap mode will be described in the following sections (A-3) and (A-4), respectively.

Figure 5A:
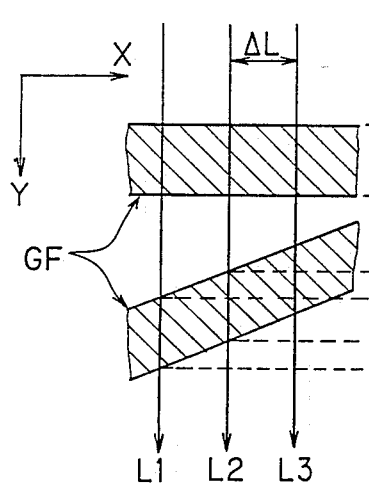
FIGS. 5A and 5B are explanatory diagrams showing a process of generating cross point data and storing the same in the buffer memory circuit 23.
Figure 5B:
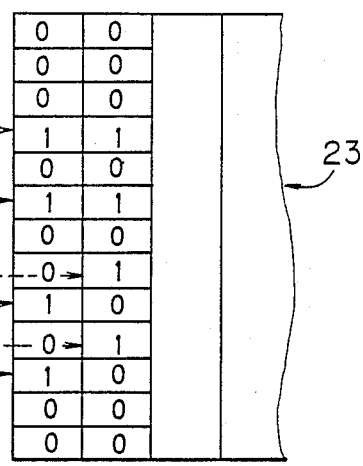

FIG. 5A schematically shows a process of calculating the cross points of scanning lines L1–L3 and the contour lines of a graphic figure GF represented by the vector data. FIG. 5B is a schematic diagram showing the cross point data being stored in the line memories included in the buffer memory circuit 23, where correspondence between respective cross points in FIG. 5A and the cross point data in the line memories is indicated by dotted arrows.

When the vector data expressing the contour lines of the graphic figure GF are transmitted from the image data generator 10 to the vector/point converter 21, the vector/point converter 21 calculates respective Y-coordinates of the cross points of the scanning lines (L1–L3, for example) and the contour lines of the graphic figure GF, thereby to convert the vector data into the cross point data. The cross points correspond to points at which the laser beams should be turned on or off in the recording scan along the scanning lines L1–L3. The cross point data or the respective Y-coordinates thus calculated are transmitted to the memory controller 22 one by one for each scanning line. The value of the line pitch ΔL shown in FIG. 5A is variable in accordance with a designated recording mode, and the value for the overlap mode is one half of that for the unoverlap mode, in the preferred embodiments.

The memory controller 22 of FIG. 2 fetches the cross point data from the vector/point converter 21 in response to a data request signal D-Req. The transmittance of the cross point data is acknowledged by generating a data request acknowledge signal D-Req Ack. The memory controller 23 selects a line memory for each scanning line according to a selection rule which will be described later, and stores the cross point data in the selected line memory. The storage of the cross point data is achieved by writing a value "1" in an address corresponding to the transmitted Y-value in the selected line memory (see FIG. 5B). Upon receiving the data request acknowledge signal D-Req Ack, the vector/point converter 21 outputs next cross point data to the memory controller 22 to repeat the storage operation.

The vector/point converter 21 outputs an end signal END when transmittance of the cross point data for one scanning line is completed. In response to the end signal END, the memory controller 22 selects another line memory whereby the same becomes ready to store the cross point data for the next scanning line. The memory controller 22 generates an end acknowledge signal END Ack to inform the vector/point converter 21 about the updating of the selected line memory. In response to the end acknowledge signal END Ack, the vector/point converter 21 starts to output the cross point data for the next scanning line, which will be written in the line memory currently selected.

Referring now to FIGS. 6A–6H, there are shown timings charts in reading the cross point data out of the buffer memory circuit 23. The memory controller 22 fetches the rotation timing pulses PT (FIG. 8A) from the timming pulse generator 42 (FIG. 1). Since the timing pulse generator 42 generates one pulse for every rotation of the drum 40 by a predetermined angle, each of the pulse cycles corresponds to a pixel pitch in the main scanning direction Y. The memory controller 22 generates a signal CS (FIG. 2) to designate one of the buffer memories 23A–23B while generating an address signal ADR (FIG. 6B) in synchronism with the rotation timing pulse PT to designate an address in the designated line memory. During a write/read signal R/W shown in FIG. 6C is at a "H" level, the cross point data is read out of the addresses designated by the address signal ADR (see FIG. 6D), where the read-out operation is conducted in parallel for nine line memories included in the designated buffer memory and in series for respective pixels included in each line memory.

Referring to FIG. 2, respective cross point data outputted from the nine line memories in the designated buffer memory (23A, for example) are given to the first inputs of the AND gates G1-G9, respectively. The memory controller 22 generates a timing signal or a train of gate pulses ST (FIG. 6E), and give the same to the AND gates G1-G9, respectively. The memory controller 22 generates a timing signal or a train of gate pulse ST (FIG. 6E), and give the same to the AND gates G1-G9 as the second inputs thereof. The timing signal ST periodically opens the AND gates G1-G9, whereby the cross point data for nine scanning lines are transmitted to the flip-flops FF1-FF9, respectively. FIG. 6F shows an example of the transmitted data or signal. The flip-flops FF1-FF9 are J-K flip-flops, and therefore, each of the respective Q-outputs changes from "H" level to "L" level or from "H" to "L" level every time a pulse is given to the corresponding clock terminal. The dot data DD is a bundle of the Q-outputs from the nine flip-flops FF1-FF9, and has nine components corresponding to the nine Q-outputs. FIG. 6G shows an example of the nine components. The illustrated component rises to a "H" level in response to the first pulse in FIG. 6F which is supposed to be a pulse indicating a change on the imaging pattern from "white" to "black", and then, the component falls to a "L" level in response to the next pulse indicative of a reverse change on the imaging pattern. As a result, it is indicated that the photosensitive film F should be exposed with an activated laser beam during the waveform shown in FIG. 6G is at the "H" level. The dot data DD having such a character is delivered to the modulation controller 25 provided in the next stage.

During the cross point data are read out of the respective line memories belonging to the designated buffer memory, the memory controller 22 continuously gives a data "0" to the respective line memories as shown in FIG. 6H. Accordingly, every time a component of the cross point data has been read-out and the read/write signal R/W becomes a "L" level, the data "0" is written at an address from which the component has been read-out.

As will be understood later, the process of reading the cross point data out of the designated buffer memory is repeated cyclically for the buffer memories 23A-23C. A buffer memory which is cleared after the reading operation of the cross point data is ready to accept next cross point data.

In the following sections (A-3) and (A-4), details of the overlap mode and the unoverlap mode will be described.

(A-3) Overlap Mode

The principle of image recording in the overlap mode will be now described with reference to FIGS. 7A and 7B. FIG. 7A shows an array of parallel scanning lines L. Each of the scanning lines L substantially extends in the main scanning direction Y, and the scanning lines L are arrayed in the subscanning direction X at the designated line pitch $\Delta L = \Delta L_1$. FIG. 7B is a schematic perspective view showing the alignment of the nine photospots SP1-SP9 which are formed on the photosensitive film F by the modulated nine laser beams LB1-LB9, respectively. The photospots SP1-SP9 are aligned in the subscanning direction X at the line pitch P which substantially satisfies the condition:

$$P = 2\Delta_{:1} (= D) \qquad (2)$$

The modulated nine laser beams LB1-LB9 are classified into "front laser beams" FLB (LB5-LB9) and "rear laser beams" RLB (LB1-LB4). The front laser beams FLB exist in a first side to which the subscanning is to be advanced, while the rear laser beams RLB exist in a second side opposite to the first side. In accordance with the classification of the modulated laser beams LB1-LB9, the nine photospots SP1-SP9 are also classified into "front photospots" FSP(SP5-SP9) and "rear photospots" RSP(SP1-SP4). The difference between the respective numbers of the front laser beams FLB and the rear laser beam RLB is minimized. That is, since the total number of the laser beams LB1-LB9 is nine in the first preferred embodiment, the difference is minimized when the number of the front laser beams FLB is five (or four) and that of the rear laser beams RLB is four (or five).

In general, modulated N laser beams are classified into front laser beams and rear laser beams so that difference between respective numbers of the front laser beams and the rear laser beams is one for an odd integer N and zero for an even integer N. The second preferred embodiment which will be described later corresponds to the case where the number N is an even integer.

The scanning lines L shown in FIG. 7A are scanned with the modulated laser beams LB1-LB9 through a sequence of main scannings. Each of the main scannings is conducted with the modulated laser beams LB1-LB9, and the sequence is directed to the subscanning direction X. Supposing that i is a positive integer, the i-th main scanning is performed for nine scanning lines belonging to the i-th line group LGi which consists of the i-th front line group $LF_i$ and the i-th rear line group $LR_i$. The i-th front line group $LF_i$ has five scanning lines selected every second scanning lines, while the i-th rear line group $LR_i$ has four scanning lines also selected every second scanning line. The nine scanning lines in the line group $LG_i$ are arrayed at a pitch $2\Delta L_1 (=P)$, and are scanned in parallel by means of the nine laser beams LB1-LB9, respectively.

In the (i+1)-th main scanning which follows the i-th main scanning in the aforementioned sequence (hereinafter called as "scanning sequence"), other nine scanning lines belonging to the (i+1)-th line group $LG_{i+1}$ are scanned in parallel by means of the laser beams LB1-LB9. Similarly to the i-th line group $LG_i$, the (i+1)-th line group $LG_{i+1}$ consists of the (i+1)-th front line group $LF_{i+1}$ having five scanning lines and the (i+1)-th rear line group $LR_{i+1}$ having four scanning lines. Other line groups $LG_{i-2}$, $LG_{i+1}$, $LG_{i+2}$, ... are also defined by other scanning lines.

As shown in FIG. 7A, the five scanning lines belonging to the i-th front line group LFi are positionally alternated with the four scanning lines belonging to the (i+1)-th rear line group $LR_{i+1}$. The alternation rule is held in each combination of a front line group and a rear line group which are scanned by successive two main scannings, respectively. The alternation rule will be understood by the alternation of the scanning lines depicted by solid lines with small circles and the other scanning lines depicted by the dotted lines with cross marks. In the first preferred embodiment employing an odd number of laser beams, all scanning lines can be scanned by either of the nine laser beams LB1-LB9 without partially modifying the alignment intervals between the laser beams or photospots. Since the line pitch $\Delta L_1$ is smaller than the diameter D of each photospot, the traces of photospots on neighboring scanning lines partially overlap each other.

The process of attaining the overlap mode for an odd integer N=9 will be now described. When the operator selects the overlap mode by operating the keyboard 13 in the image data generator 10, the recording mode signal Sm (FIG. 1) designating the overlap mode is generated to be transmitted to the vector/point converter 21 and the memory controller 22. FIGS. 8A-8D schematically show the data stored in the buffer memoried 23A-23D at respective steps of writing and reading-out the cross point data. The numerals "1" through "9" which are aligned at respective top spaces on columns indicate the first through ninth line memories, respectively. On the other hand, the numerals which are depicted in the columns and enclosed by circles indicate the serial numbers of scanning lines for which the cross point data are stored in the line memories. For example, the numeral "2" which is enclosed by the circle indicate the cross point data representing the cross points on the second scanning line. In the following description, cross point data for one scanning line will be called as "a line data". The numeral "0" in the columns indicates a "cleared line memory", and the columns without numerals therein also indicate "cleared line memories". The depiction rule is also applied to FIGS. 15A-15D, which will be referred to in connection with the second preferred embodiment.

Prior to writing of the cross point data, the line memories No.1 through No.4 in the first buffer memory 23A are initialized or cleared to "0". The vector/point converter 21 serially delivers the line data for the scanning lines No.1-9 to the buffer memory circuit 23. Under read/write control by the memory controller 22, the line data for the odd-numbered scanning lines Nos. 1, 3, ..., 9 are written in the line memories Nos. 5-9 of the first buffer memory 23A, respectively (see FIG. 8A), while the line data for the even-numbered scanning lines Nos. 2, 4, 6 and 8 are written in the line memories Nos. 1-4 of the second buffer memory 23B.

Figures 8A, 8B:
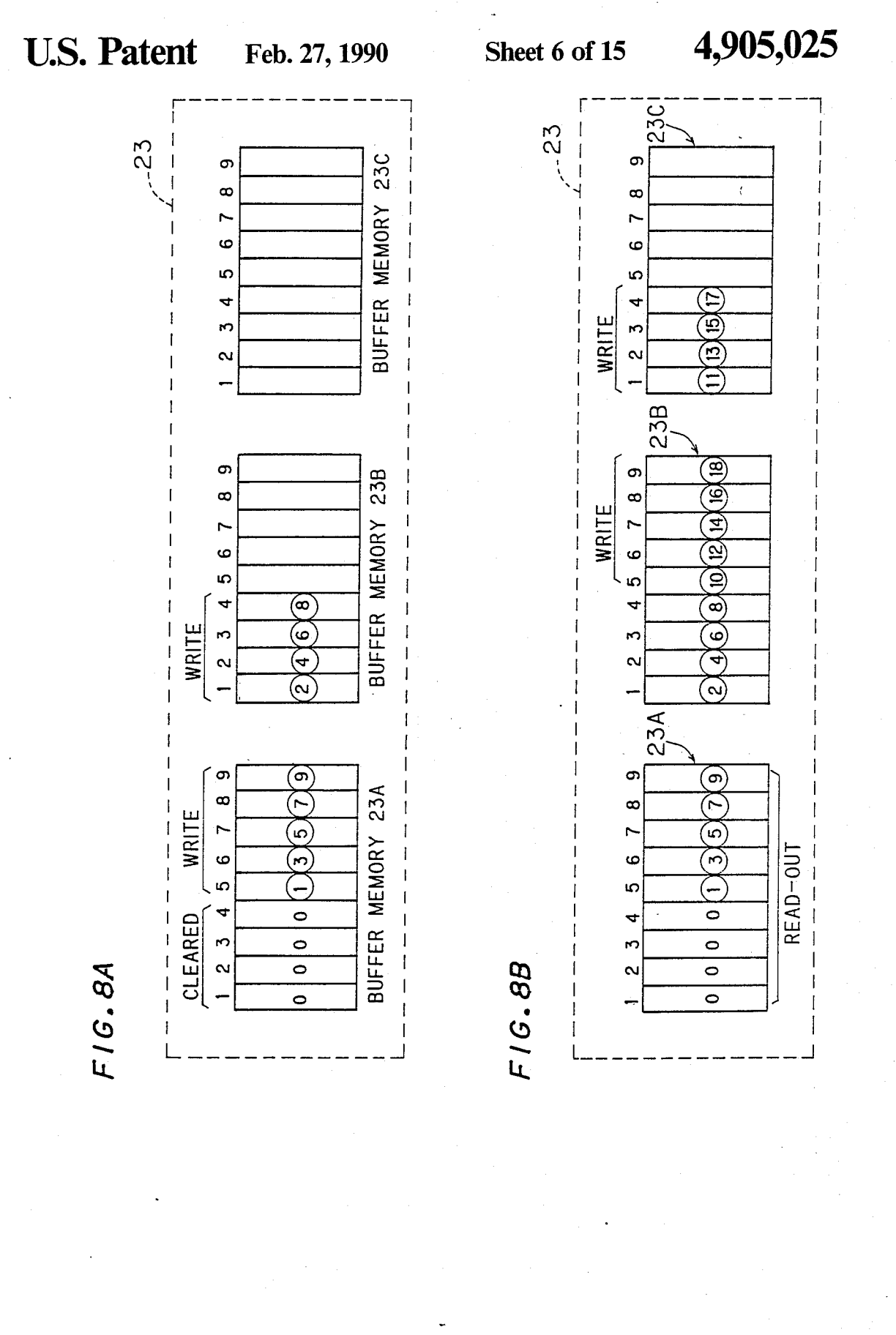

When the state shown in FIG. 8A is obtained, the image recorder is ready to start the image recording on photosensitive film F. Then, as shown in FIG. 8B, the data which are stored in the line memories Nos. 1-9 of the first buffer memory 23A are read-out in parallel, while the line data for the scanning lines Nos. 10, 12, ..., 18 are written in the line memories Nos. 5-9 of the second buffer memory 23B and those for the scanning lines Nos. 11, 13, 15 and 17 are written in the line memories Nos. 1-4 in the third buffer memory 23C, respectively. In response to the readout operation of the first buffer memory 23A, respective line images on the scanning lines Nos. 1-9 are recorded with the laser beams LB1-LB9.

Figure 8C:
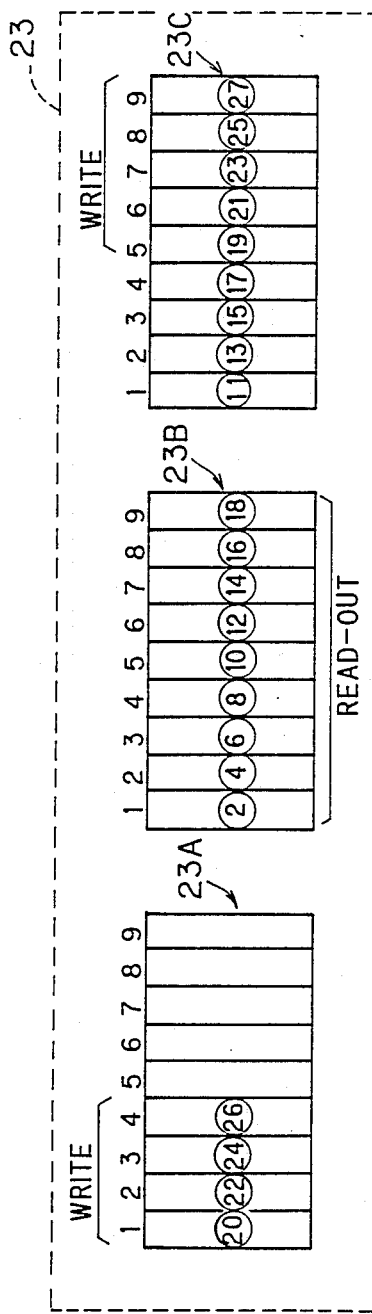
Figure 9A:
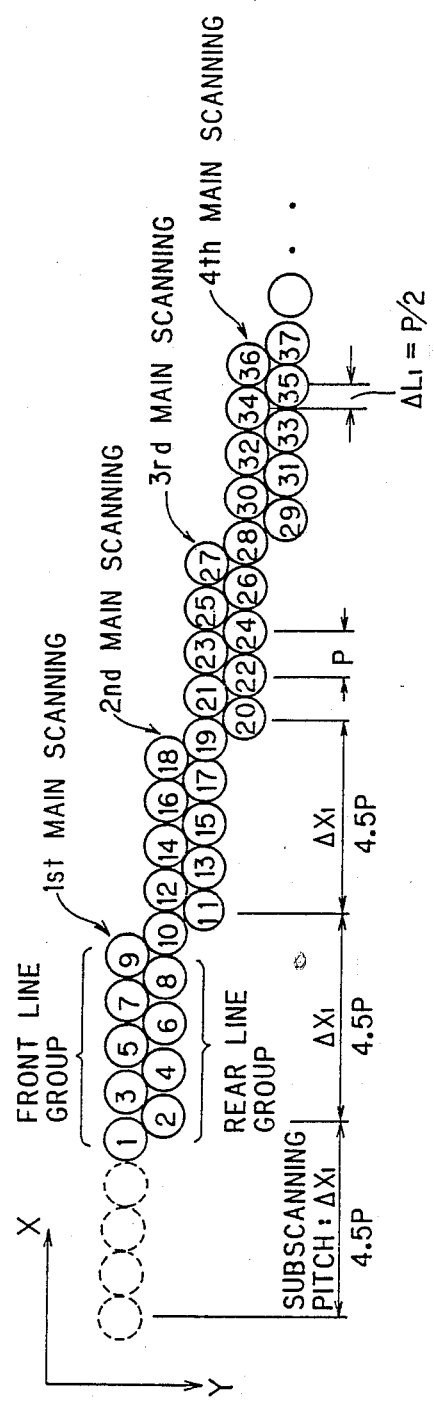
FIG. 9A shows positional relationship between respective scanning lines which are scanned in the overlap mode, where number N of laser beams is nine.

FIG. 9A schematically shows the positional relationship between respective main scannings, where only the starting points of respective scanning lines are illustrated by circles. Although all of the starting points are aligned along the subscanning direction X in practice, they are depicted as steps of chains for easy understanding of the relationship between respective main scannings using the multibeams. The numerals enclosed by the circles indicate the serial numbers of scanning lines which are identical to the serial numbers of the line data used to record the line images on the scanning lines. Since the line data for the scanning lines Nos. 1, 3, 5, 7 and 9 are first used to generate the dot data DD, the line images on the scanning liens Nos. 1, 3, 5, 7 and 9 are recorded on the film F by the first main scanning with the laser beams LB1-LB9. The dotted circles in FIG. 9A represent dummy scanning lines which are not exposed with laser beams because the data "0" is given to the line memories Nos. 1-4 in the first buffer memory 23A (see FIG. 8A). The dummy scanning lines are provided so that the scanning lines Nos. 1, 3, 5, 7 and 9 are scanned with the laser beams LB5-LB9 belonging to the front laser beams FLB.

In response to completion of the first main scanning, the line data for the scanning liens Nos. 2, 4, ..., 18 are read-out from the second buffer memory 24B as shown in FIG. 8C, while the line data for the scanning lines Nos. 19, 21, ..., 27 are written in the line memories Nos. 59 of the third buffer memory 23C, and those for the scanning lines Nos. 20, 22, 24 and 26 are written in the line memories Nos. 1-4 of the first buffer memory 23A, respectively. The second main scanning with the multibeams is attained using the line data for the scanning lines Nos. 2, 4, ..., 18, as shown in FIG. 9A. In order to proceed the main scanning to the scanning lines Nos. 2, 4, ..., 18, the subscanning is conducted as follows:

The memory controller 22 (FIG. 1) generates the speed command pulses $P_S$ so that the rotation speed $V_R$ of the screw rod 37 has a value of:

$$V_R = M \cdot P \cdot V_V/(2K) = 4.5\ P \cdot V_D/K \tag{3}$$

Accordingly, from the conditions (1) and (3), a subscanning pitch $\Delta X_1$ for the overlap mode becomes:

$$\Delta X_1 = N \cdot P/2 = 4.5P \tag{4}$$

From the condition (2), the equation (4) may be rewritten as:

$$\Delta X_1 = \Delta L_1 \cdot N \tag{5}$$

Consequently, the laser beams LB1-LB9 move in the subscanning direction X by the subscanning pitch $\Delta X_1$ in the time period between the first and second main scannings. Therefore, as shown in FIG. 9A, the scanning lines Nos. 2, 4, ..., 18 which are scanned in the second main scanning are shifted in the subscanning direction X by the subscanning pitch $\Delta X_1$ from the prior nine scanning lines, i.e., the four dummy scanning lines and the scanning lines Nos. 1, 3, ..., 9, respectively. Since the subscanning pitch $\Delta X_1$ is odd halves the alignment pitch P (i.e., 4.5P) and is substantially half of the alignment length NP (=9P) of the nine photospots, the scanning lines Nos. 1, 3, ..., 9 belonging to the front line group subjected to the first main scanning are positionally alternated with the scanning lines Nos. 2, 4, ..., 8 belonging to the rear line group subjected to the second main scanning.

Figure 8D:
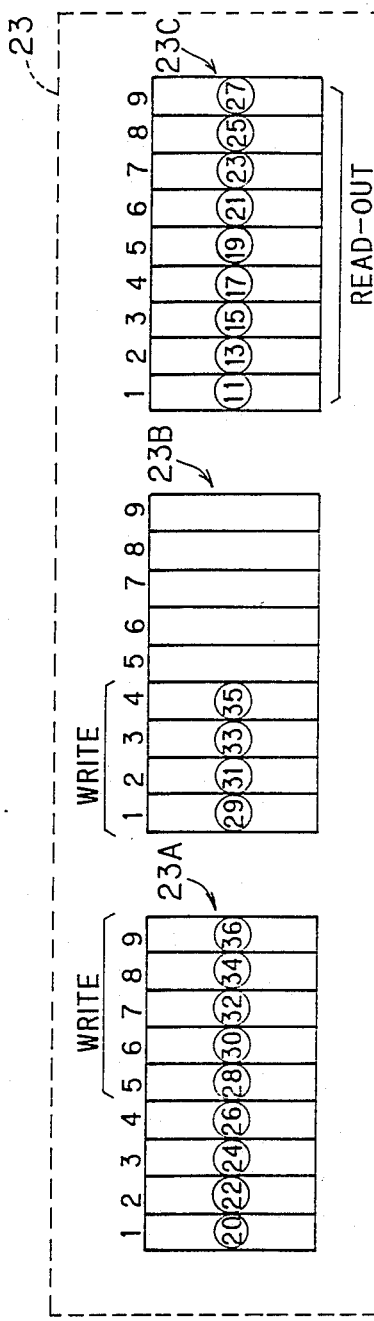

In parallel with the second main scanning, the line data for the scanning lines Nos. 28, 30, ..., 36 and Nos. 29, 31, ..., 35 are written in the first and second buffer memories 23A and 23B, respectively, as shown in FIG. 8D, while the line data for the scanning lines Nos. 11, 13, ..., 27 are read-out from the third buffer memory 23C for the third main scanning. The laser beams LB1–LB9 are further moved by the subscanning pitch $\Delta X_1$, whereby the third main scanning is performed for the scanning lines Nos. 11, 13, ..., 27 (FIG. 9A). The aforementioned process is repeated while cyclically using the buffer memories 23A–23C for other scanning lines. As a result, the image is recorded on the photosensitive film F along the sequence of main scannings which has been described with reference to FIG. 7A.

Since the scanning line pitch $\Delta L_1$ is smaller than the diameter D of each photospot, the recorded image is an image of high quality. Furthermore, the fine pitch recording can be attained without decreasing the alignment pitch P of the laser beams LB1–LB9, whereby optical interference between adjacent laser beams is prevented.

(A-4) Unoverlap Mode

When the unoverlap mode is selected by the operator, the recording mode signal Sm (FIG. 1) designating the unoverlap mode is generated to be transmitted to the vector/point converter 21 and the memory controller 22. In response to the recording mode signal Sm, the memory controller 22 selects the first and second buffer memories 23A and 23B for a normal pitch recording or a high speed recording.

In data arrangement for the image recording, the line data for the scanning lines Nos. 1–9 are delivered from the vector/point converter 21 to the first buffer memory 23A, and are stored in the line memories Nos. 1–9 thereof, respectively. Then, the line data for the scanning lines Nos. 1–9 are read-out in parallel from the first buffer memory 23A to be converted into the dot data DD, while the line data for the next scanning lines Nos. 10–18 are written in the line memories Nos. 1–9 of the second buffer memory 23B. The line data for the scanning lines Nos. 10–18 are then read-out, while the next line data are written in the first buffer memory 23A.

The read/write operation is repeated while proceeding the process to further next nine scanning lines and alternately using the buffer memories 23A and 23B for the read/write operation. Consequently, the line data are converted into the dot data DD for each set of successive nine scanning lines.

On the other hand, the memory controller 22 generates the speed command pulses $P_S$ so that the rotation speed $V_R$ of the screw rod 37 has a value of:

$$V_R = N \cdot R \cdot V_D / K = 9 \, P \cdot V_D / K \quad (6)$$

and the subscanning pitch $\Delta X_2$ for the unoverlap mode becomes:

$$\Delta X_2 = N \cdot P = 9P \quad (7)$$

which is two times the subscanning pitch $\Delta X_1 = 4.5\,P$ for the overlap mode. The unoverlap mode is intended for image recording with a scanning line pitch $\Delta L_2$ being two times the scanning line pitch $\Delta L_1$ for the overlap mode, and therefore, the following equations (8) and (9) are obtained:

$$P = \Delta_{\cdot 2} \quad (8)$$

$$\Delta X_2 = \Delta L_2 \cdot N \quad (9)$$

where the alignment pitch P is common to the overlap mode and the unoverlap mode.

Figure 9B:
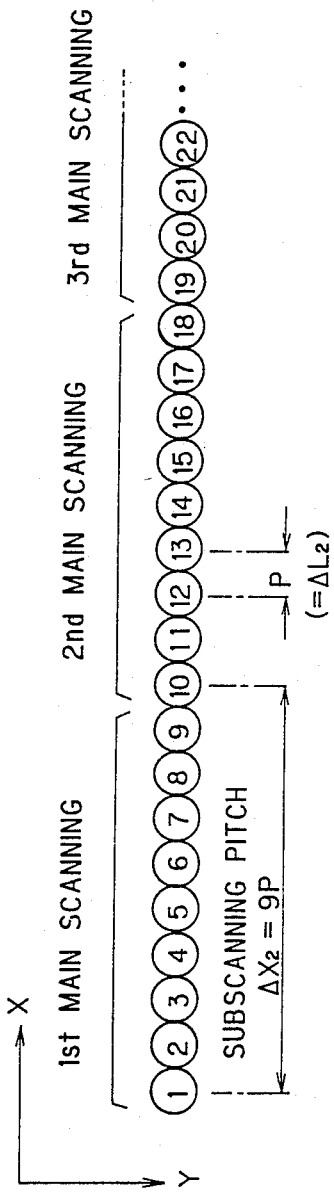
FIG. 9B shows positional relationship between respective scanning lines in an unoverlap mode for N=9.

The laser beams LB1–LB9 are moved in the subscanning direction X by the subscanning pitch $\Delta X_2 = 9P$ for each main scanning or for each rotation of the recording drum 40. As a result, as shown in FIG. 9B, the photosensitive film F is scanned with laser beams LB1–LB9 so that the nine scanning lines which are scanned in one main scanning are just followed by other nine scanning lines which are scanned in the next main scanning. The respective scanning lines are arrayed in the subscanning direction X at the pitch equal to the alignment pitch P of the photospots, and substantial overlap between adjacent traces of photospots are not caused. The scanning line No. 9 existing at the leading position within the scanning lines Nos. 1–9 for the first main scanning is adjacent to the scanning line No. 10 existing at the last position within the scanning lines Nos. 10–18 for the second main scanning. Since the subscanning speed in the unoverlap mode is twice the subscanning speed in the overlap mode, the total time for recording the whole image is reduced by the factor two.

B. Second Preferred Embodiment

The second preferred embodiemnt is directed to an image reader generating an even number of laser beams (i.e., N = an even integer). The laser beams are individually modulated by the dot data to become modulated laser beams. The modulated laser beams are classified into "front laser beams" and "rear laser beams" according to a criterion similar to the first preferred embodiment. Since N is an even integer, the modulated laser beams can be classified into the front laser beams and the rear laser beams so that respective numbers thereof are same to each other (i.e., N/2). Similarly, N photospots which are formed on the photosensitive film F by the modulated laser beams are classified into N/2 front photospots and N/2 rear photospots.

Due to the reason which will be described later, the N/2 front photospots are aligned at an alignment pitch P and the N/2 rear photospots are also aligned at the same pitch P, but the distance between respective centers of two photospots neighboring each other across the boundary gap between the N/2 front photospots and the N/2 rear photospots is 1.5P rather than P. In order to attain periodical main scannings, the subscanning pitch $\Delta X$ is set at $(P \cdot N)/2$ for a fine pitch recording and $(P \cdot N)$ for a normal pitch recording (i.e., a high speed recording). The fine pitch recording and the normal pitch recording correspond to an overlap mode and unoverlap mode, respectively. Details of the second preferred embodiment are as follows:

(B-1) Construction of Image Recorder

The image recorder according to the second preferred embodiment has a structure similar to the first preferred embodiment. Accordingly, only parts of the structure which are different from the first preferred embodiment will be described.

When the image reader is operable to generate ten laser beams (i.e., N = 10), for example, each of the buffer memories 23A–23C is provided with ten line memories and the dot data generator 24 has ten AND gates and ten J-K flip-flops. Although the buffer memories 23A–23C and the dot data generator 24 modified for the second preferred embodiment are not illustrated in the drawings, they will be easily understood by those skilled in the art on the analogy of the circuit diagram shown in FIG. 2.

FIG. 10 is an internal perspective view of the recording head 31 which is modified for the second preferred embodiment so that the distance between the neighboring two photospots across the boundary gap between the front photospots and the rear photospots is variable. A laser beam B1 generated by a laser oscillator 32 is divided into two laser beams B2 and B3 by a beam splitter 51. The laser beam B2 is reflected by a mirror 52 to enter another beam splitter 53. The laser beam B2 is splitted into five laser beams B4 by the beam splitter 53. An AOM 54 is operable to individually modulate the five laser beams B4 in an ON/OFF modulation mode. The five laser beams B4 thus modulated are reflected by a mirror 55 to enter a polarizing beam splitter 5G.

On the other hand, the laser beams B3 which is obtained in the beam splitter 51 is reflected by mirrors 57 and 58, whereby the polarization plane of the laser beam B3 is rotated by 90°. Then, the laser beam B3 is splitted into five laser beams B6 by a beam splitter 59. An AOM 60 modulates the five laser beams B6 individually in an ON/OFF modulation mode. The modulated laser beams B7 are reflected by a mirror 61, and then given to the polarizing beam splitter 56 through a beam shifter 62.

Figure 11:
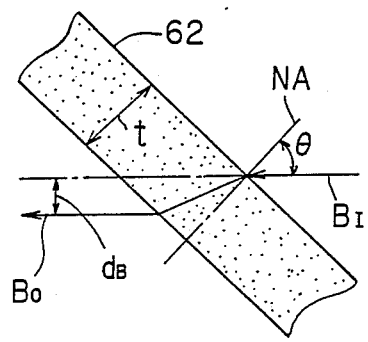
FIG. 11 is a partial sectional view of a beam shifter 62.

Referring to FIG. 11 the beam shifter 62 is a transparent plate having parallel major surfaces. When the normal axis NA of the transparent plane is inclined from the light axis of an input beam $B_I$, the input beams $B_I$ is converted into an output beam $B_o$ having an light axis which is shifted from the light axis of the input beam $B_I$ in parallel by the distance $d_B$:

$$d_B = t\,[1-\cos\theta/(n^2-\sin^2\theta)^{1/2}]\sin\theta \quad (10)$$

where t is the thickness of the transparent plate and n is the index of refraction of the transparent plate.

When the overlap mode is selected, the angle $\theta$ is set at the value $\theta_0$ which satisfies the following equation (11):

$$P/2 = t\,[1-\cos\theta_0/(n^2-\sin^2\theta_0^{1/2}]\sin\theta_0 \quad (11)$$

Figure 12:
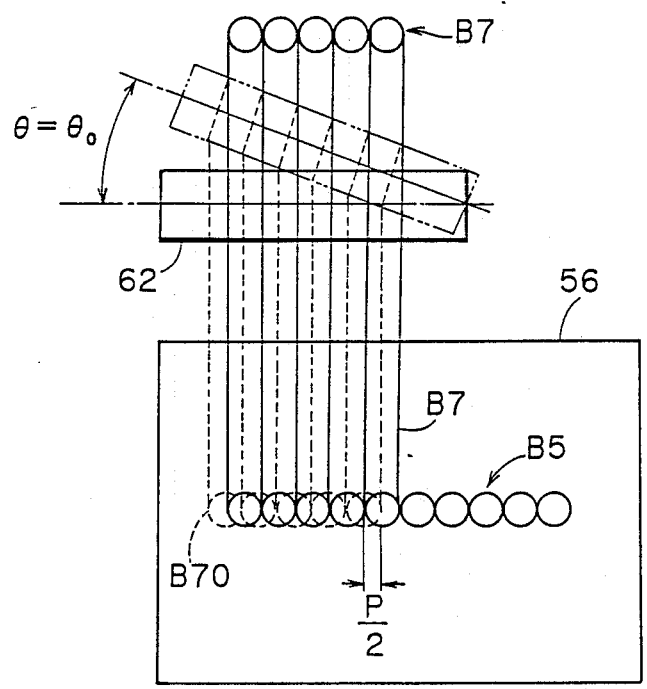
FIG. 12 is an expalnatory diagram showing a positional shift of laser beams B7.
Figure 15A:
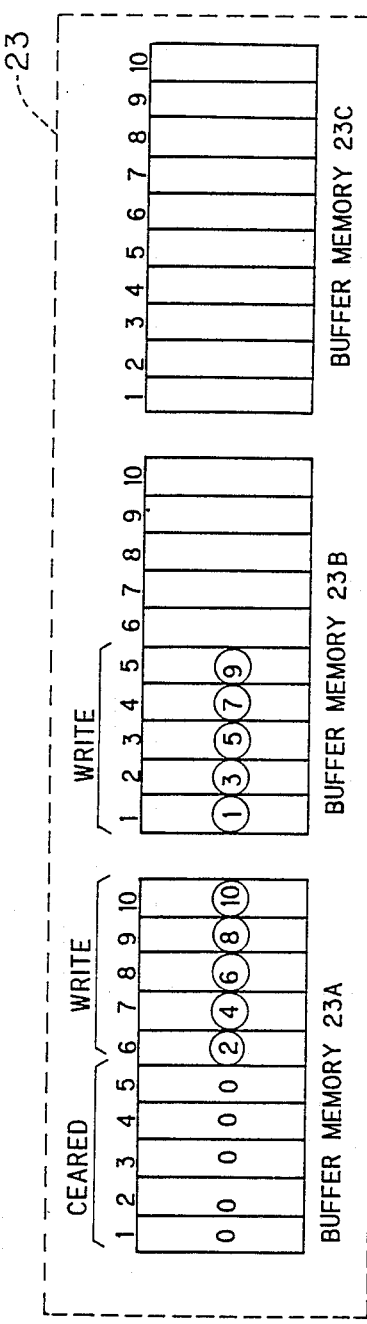
FIGS. 15A through 15D are schematic diagrams showing line data stored in the buffer memory circuit 23 at respective stages of image recording in an overlap mode according to a second preferred embodiment of the present invention.
Figure 15B:
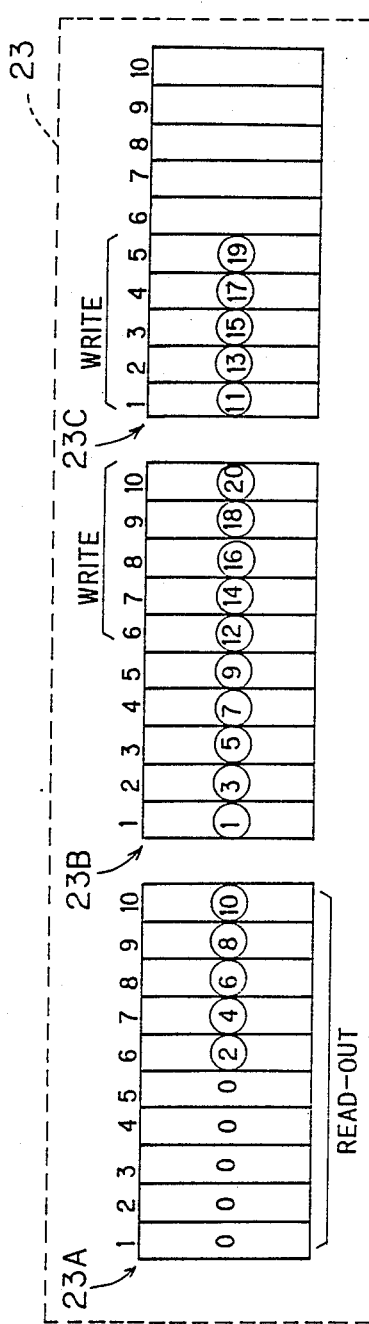
Figure 15C:
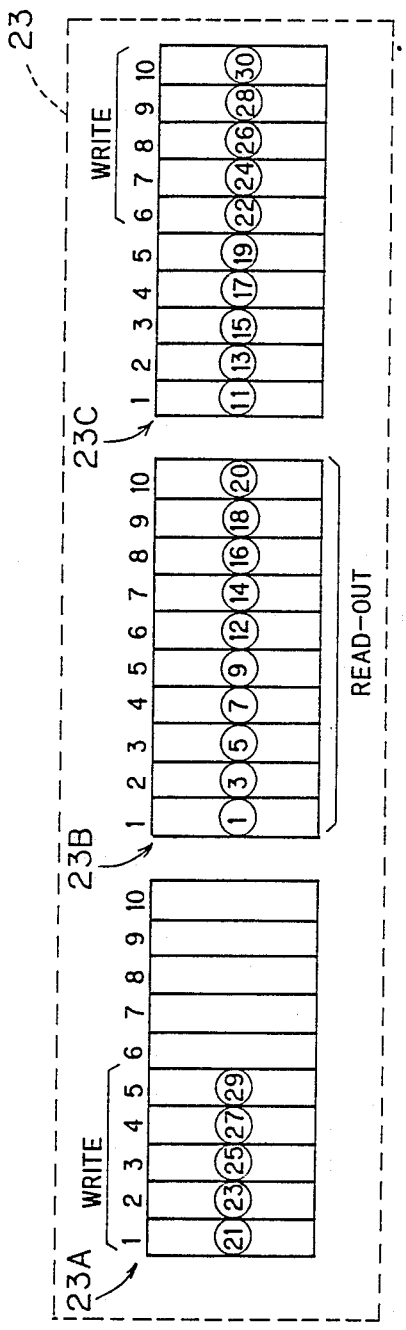
Figure 15D:
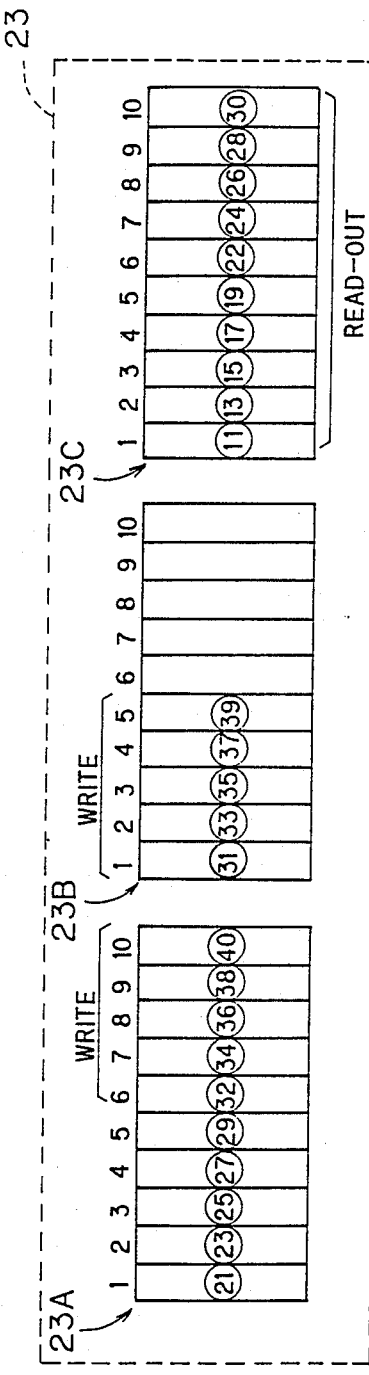

Accordingly, the five photobeams B7 which are inputted to the beam shifter 62 are converted into photobeams B70 (FIG. 12) which are shifted from the photobeams B7 by the distance P/2. The variation of the angle $\theta$ is attained by enabeling a rotary actuator 63 (FIG. 10) whose rotary axis is coupled to the beam shifter 62. The rotarY actuator 63 may be a rotary solenoid, a pulse motor or the like.

On the other hand, when the unoverlap mode is designated, the angel $\theta$ is set at 0° by the rotary actuator 63. In this case, no shift is given to the laser beams B7, whereby the laser beams B7 are aligned with the laser beams B5 without an additional shift.

The laser beams B7 (or B70) having passed through the beam shifter 62 is given to the polarizing beam splitter 56. The polarizing beam splitter 62 functions as an optical element for combining the laser beams B7 (B70) with the laser beams B5, whereby an alignment of laser beams B7 (B70) and B5 is obtained. These beams are supplied onto the photosensitive film F.

Figure 13A:
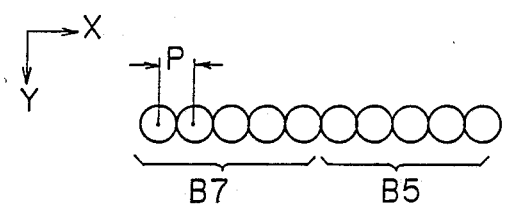
FIGS. 13A and 13B are diagrams showing alignments of photospots in the unoverlap and overlap modes, respectively.
Figure 13B:
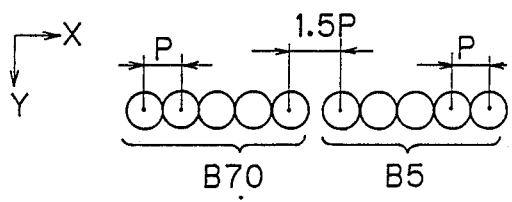

FIG. 13A shows an alignment of photospots which are formed on the photosensitive film F by the laser beams B5 and B7 in the case where the angle $\theta$ is substantially set at 0°. All beams are aligned at the pitch P, and the alignment are used for image recording in the unoverlap mode. On the other hand, FIG. 13B shows another alignment of photospots which are obtained by the laser beams B5 and B7O in the case where the angle $\theta$ is substantially set at $\theta_0$. The distance between respective center points of neighboring two photospots across the boundary gap between the laser beams B5 and B7O is substantially 1.5P, since the shift P/2 (=0.5P) in the subscanning direction X is given to the laser beams B7O. The alignment shown in FIG. 13B is used for image recording in the overlap mode.

The recording head 31 shown in FIG. 10 has an advantage in that loss of light in combining laser beams B7 (B70) and B5 with each other is quite small since the laser beams B7 (B7O) and B5 are polarized in orthogonal directions and they are combined by the polarizing beam splitter 56. However, if an unpolarizing beam splitter is employed in place of the polarizing beam splitter 56, the mirror 57 for rotating the polarization plane is not required although loss of light is caused.

Another example of the recording head 31 is shown in FIG. 14, in which only the characteristic structure is depicted in a perspective view. A mirror 55 is slidably provided on a guide rail 64. The laser beams B5 are reflected by the mirror 55, and then combined with the other laser beams B7 by the polarizing beams splitter 56. When the mirror 55 is slided along the guide rail 64, the light path of the reflected laser beams B5 shifts in the direction perpendicular to the light path, so that the distance between the laser beams B5 and B7 is varied. A linear actuator 65 operable to push and pull the mirror 55 is provided in order to slide the mirror 55 along the guide rail 64 as shown by a bidirectional arrow in FIG. 14. The linear actuator 65 may be a push-pull solenoid. Similarly to the example shown in FIG. 10, the linear actuator 65 moves the mirror 55 so that the additional shift P/2 is given between the laser beams B5 and B7 for the Overlap mode. If the unoverlap mode is designated, the mirror 55 is set at its initial position, whereby the laser beams B5 and B7 which are outputted from the beam splitter 56 are aligned at the pitch P without the additional shift P/2.

The read/write operation of the buffer memories 23A–23C is as follows:

(B-2) Overlap Mode

When the overlap mode is selected, the recording mode signal Sm designating the overlap mode is generated and transmitted to the recording head 31 as well as the vector/point converter 21 and the memory controller 22. The transmittance of the signal Sm to the recording head 31 is not shown in FIG. 1 which is drawn for the first preferred embodiment, since the same is characteristic of the second preferred embodiment. In response to the recording mode signal Sm, the beam shifter 62 in FIG. 10 (or the linear actuator 65 in FIG. 14) is enabled to arrange the laser beams B5 and B70 into the modified alignment shown in FIG. 13B.

On the other hand, the vector/point converter 21 outputs the line data or the cross point data for each scanning line, and the memorY controller 22 controls the buffer memories 23A–23C for read/write operation thereof. FIGS. 15A–15D are schematic diagrams showing the data stored in the buffer memories 23A–23C for the first through fourth main scannings, respectively. As is understood by comparing FIG. 8A–FIG. 8D with FIG. 15A–FIG. 15D, the read/write operation in the second preferred embodiment is substantially identical to that in the first preferred embodiment except that each of the buffer memories 23A–23C in the second preferred embodiment can store the line data for ten scanning lines. Therefore, the detailed description of FIG. 15A–FIG. 15D is omitted here.

In the overlap mode for N=10, the rotation speed $V_R$ of the screw rod 37 (FIG. 1) is set at:

$$V_r = N \cdot P \cdot V_D/(2K) = 5 \, P \cdot V_D/K \qquad (10)$$

by the speed command pulses $P_S$. Accordingly, a subscanning pitch $\Delta X_1$ for the overlap mode is given by:

$$\Delta x_1 = N \cdot P / 2 = 5P \qquad (11)$$

through the conditions (1) and (10).

FIG. 16A schematically shows the positional relationship between respective main scannings, where only the starting points of respective scanning lines are illustrated in the same form with FIG. 9A. The scanning lines which are scanned in one main scanning are classified into a front line group having five scanning lines and a rear line group having other five scanning lines. The classification rule is the same with the first preferred embodiment, but each line group has same number of scanning lines in the second preferred embodiment. This is because N=10 is an even integer, and it can be divided into same two integers (i.e., N/2=5). The laser beams B5 in FIG. 13B are "front laser beams" and the laser beams B70 are "rear laser beams". Front photospots and rear photospots are also defined as those formed by the front and rear laser beams, respectively. Neighboring traces of photospots partially overlap each other by the overlap width P/2.

As shown in FIG. 16A, the scanning lines belonging to the front line group are alternated with the scanning lines which are scanned by the following main scanning. Also referring to FIG. 13B, the front photospots formed by the front laser beams B5 are aligned at the pitch P and the rear photospots formed by the rear laser beams B70 are also aligned at the pitch P, while the distance between the two photospots neighboring across the alignment boundary is 1.5P.

Figure 23:
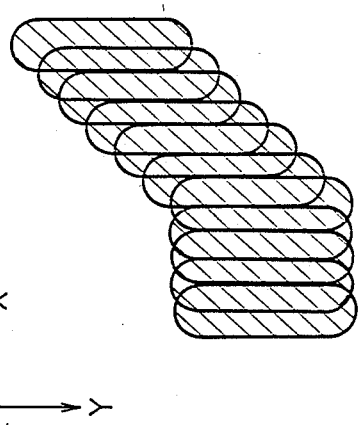
FIG. 23 shows traces of the overlapped photospots.
Figure 20:
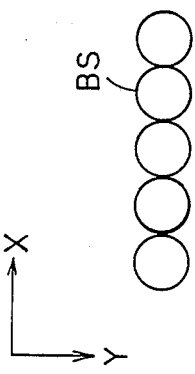
FIG. 20 shows an alignment of unoverlapped beam spots.
Figure 22:
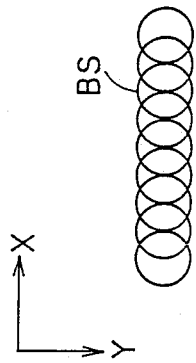
FIG. 22 shows alignment of overlapped photospots.
Figure 24:
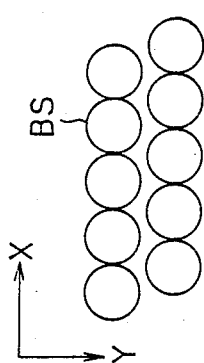
FIG. 24 shows a staggered array of photospots.

The modified alignment of the photospots is effective in the image recording with an even number of photobeams. If all of the photospots are aligned at the pitch P, the center-to-center distance between the scanning lines Nos. 9 and 12 (FIG. 16A) becomes P, and the scanning lines Nos. 9, 10, 11 and 12 cannot be aligned at the line pitch $\Delta L_1 = P/2$. Therefore, the modified alignment of photospots is meaningful in the overlap mode. The respective traces of photospots in the overlap mode is similar to those shown in FIG. 23.

(B-3) Unoverlap Mode

When the unoverlap mode is designated, the beam shifter 62 (or the mirror 55) is driven to return to the initial position so that the ten photospots are aligned at the pitch P (FIG. 13A) without an additional shift Similarly to the unoverlap mode in the first preferred embodiment, only the first and second buffer memories 23A and 23B are employed for the data arrangement. The line data for the scanning lines Nos. 1–10 are written in the first buffer memory 23A for preparation of the first main scanning. Then, the line data for the scanning lines Nos. 1–10 are read-out from the first buffer memory 23A for the first main scannings, while the line data for the scanning lines Nos. 11–20 are written in the second buffer memory 23B. The alternate use of the first and second buffer memories 23A and 23B is repeated in accordance with the repetition of the main scanning.

The rotation speed VR of the screw rod 37 is set at:

$$V_R = N \cdot P \cdot V_D \cdot K = 10P \cdot V_D \cdot K \qquad (12)$$

and a subscanning pitch $\Delta X_2$ becomes:

$$\Delta X_2 = N \cdot P = 10P \qquad (13)$$

As a result, ten scanning lines Nos. 1–10 (FIG. 16B) which are scanned by one main scanning with the ten laser beams are followed by other ten scanning lines Nos. 11–20 which are scanned by the next main scanning. All of the scanning lines are aligned at the line pitch $\Delta L_2$ which is equal to the alignment pitch P of the photospots. Substantial overlap between neighboring traces of the photospots does not exist, and the image recording is performed at a speed which is twice the recording speed in the overlap mode.

C. Modifications

The following items (c-1) through (c-6) are examples of modification in the present invention. (c-1) The present invention can be also applied to other image recorders generating laser beams whose number is an arbitrary integer larger than one. When the number is an odd integer, the image reader is controlled according to the principle similar to the first preferred embodiment, while the second preferred embodiment is applied to image records generating an even number of laser beams.

(c-2) The number of laser beams which are employed in the overlap mode may be different from that for the unoverlap mode. That is, supposing that respective numbers of laser beams in the overlap mode and the unoverlap mode are N and M, respectively, the integers N and M may satisfy either of the following conditions:
(a) N = M = an odd integer,
(b) N = an odd integer, and M = an even integer,
(c) N = an odd integer, and M = an odd integer different from N,
(d) N = M = an even integer,
(e) N = an even integer, and M = an odd integer,
(f) N = an even integer, and M = an even integer different from M.

The reason why these modification can be applied to the present invention is that the subscanning pitch $\Delta L_2$ in the unoverlap mode can be selected independent of the subscanning pitch $\Delta L_1$ in the overlap mode. If N = M, the integer N included in the expressions (6), (7), (9), (12) and (13) is replaced by M, and the subscanning pitch $\Delta L_2$ for the unoverlap mode is given by the expressions thus modified.

In the first preferred embodiment either of the conditions (a)-(c) may be employed. The construction and operation according to the condition (a) have been described. When the integers N and M are designated as N=9 and M=10 according to the condition (b), for example, the first preferred embodiment is modified as follows:

A beam splitter and an AOM which can be commercially obtained have an even number of channels, e.g., 10 channels. In the overlap mode using nine laser beams, one terminal channel among the ten channels is inactivated in the AOM so that nine laser beams are employed for the image recording. The subscanning pitch $\Delta L_1$ is set at 4.5P. In the unoverlap mode, on the other hand, all of the ten channels are activated and the subscanning pitch $\Delta L_2$ is set at 10P so that the photosensitive film is scanned with ten laser beams. As a result, the recording speed in the unoverlap mode becomes $(10P/4.5P)=2.22$ times the recording speed in the overlap mode. The buffer memories 23A-23C having ten line memories are employed in order to accept the line data for ten scanning lines. That is, all of the elements in the image recorder are constructed so as to attain the image recording with ten laser beams, and a part of them is activated or enabled in the overlap mode.

The second preferred embodiment may be attained under the condition (d), (e) or (f). The condition (d) corresponds to the construction and operation which have been described. When the recording head 31 and other elements are prepared so that the photosensitive film F can be scanned by eleven laser beams at maximum, for example, ten laser beams which are continuously aligned among the eleven laser beams are employed for the overlap mode whereas all of the eleven laser beams are used in the unoverlap mode.

(c-3) When the imaging patterns are complex ones, relatively long time is required for the image data generator 10 to generate the respective vector data, so that the delivery of the vector data to the vector/point converter 20 also requires relatively long time. Consequently, it may be caused that the delivery speed of the vector data is lower than the scanning speed and, consequently, real time recording cannot be attained. In order to avoid the problem, the number of recording channels and the recording speed may be varied according to the degree of complexity in the imaging patterns so that the delivery speed of the vector data matches the recording speed.

For example, the number of channels may be varied as follows:

(1) In the first preferred embodiment, the construction of the image recorder is modified so that the number of recording channels or employed laser beams can be varied within "9", "7", "5" and "3", or within a part of these integers for the overlap mode, while it can be varied within "9"–"2", or within a part of "9"–"2" for the unoverlap mode. The speed command pulses $P_S$ are modified in accordance with the variation of the number of channels.

Figure 17:
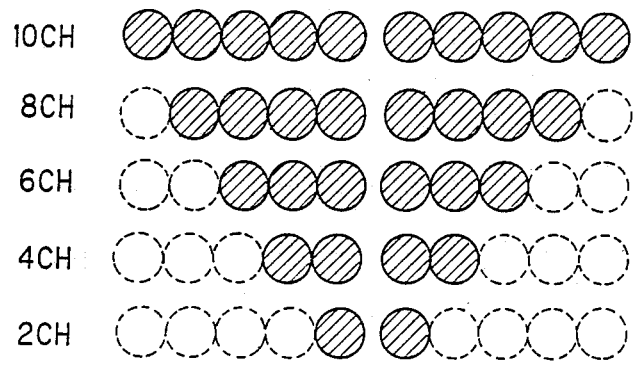
FIG. 17 and 18 show positional relationship between respective scanning lines in an unoverlap mode for N=10.

(2) In the second preferred embodiment, on the other hand, a modification is given to the image recorder so that the number of recording channels can be varied within "10", "8", "6", "4" and "2", or within a part of these integers for the overlap mode. In this case, as shown in FIG. 17 by slanted lines, same numbers of laser beams neighboring each other across the boundary gap between the front and rear laser beams are selected for image recording in accordance with the number of recording channels. The number of recording channels is varied also for the unoverlap mode within "10"–"2", or within a part of "10"–"2", while aligning the selected laser beams at the pitch P. The subscanning speed is varied in accordance with the selection of the number of recording channels, whereby the recording speed matches the delivery speed of the vector data.

Figure 18:
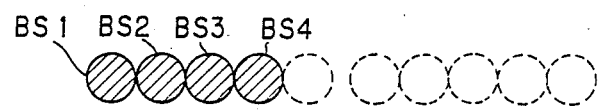
Figure 19:
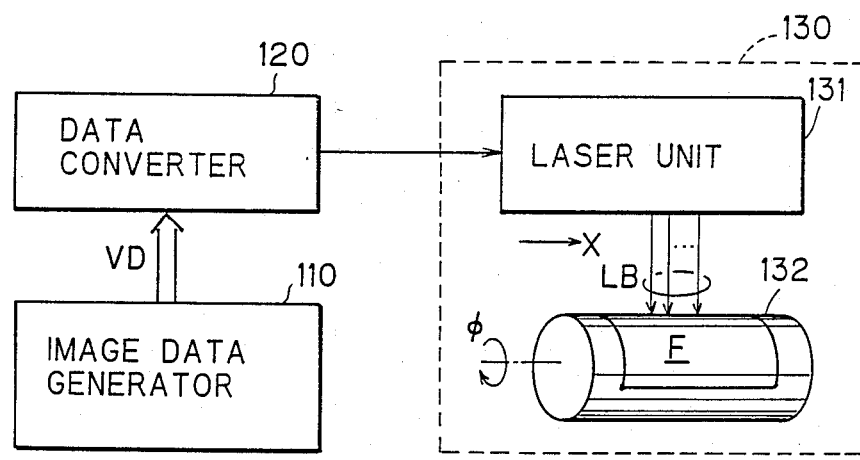
Figure 21:
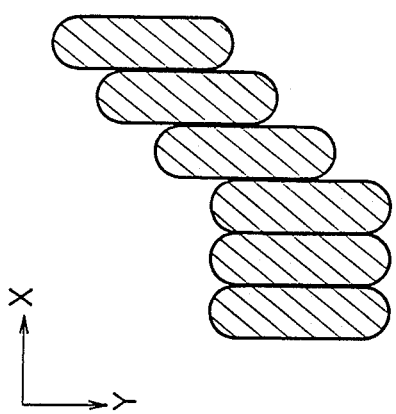
FIG. 21 shows traces of unoverlapped photospots.

When the number of recording channels for the unoverlap mode is selected from integers smaller than six, it is optional to return the beams shifter 62 (FIG. 10) or the mirror 55 (FIG.14) to its initial position so that the alignment of the front laser beams comes in contact with the alignment of rear laser beams. This is because laser beams whose number is smaller than six can be obtained within the five front laser beams or the five rear laser beams. For example, four channels are employed in the unoverlap mode, the beam spots BS1–BS4 (FIG. 18) can be employed within the front laser beams or the rear laser beams.

(c-4) As understood from the aforementioned modifications, the number of recording channels or laser beams is selected in accordance with the degree of complexity in imaging patterns, while the selection of recording mode among the overlap and unoverlap modes is based on the required quality or the line pitch in the image recording. Consequently, the selection of recording channels is independent of the selection of recording mode.

When the image recorder can generate ten laser beams at maximum, for example, the number of recording channels and the recording mode can be selected according to following Table 1, where:

"A"~"F": Symbols discriminating respective types of imaging patterns from each other, "Recording Type I": Recording type in accordance with the first preferred embodiment, i.e., N= an odd integer for the overlap mode, "Recording Type II": Recording type in accordance with the second preferred embodiment, i.e., N= an even integer for the overlap mode, "Overlap": Overlap mode, and "Unoverlap": Unoverlap mode.

TABLE 1

| Imaging Patterns | Degree of Complexity in Patterns | Required Quality | Reading Type I | Reading Type II |
| --- | --- | --- | --- | --- |
| A | Normal | High | 9 CH Overlap | 10 CH Overlap |
| B | Normal | Normal | 10 CH Unoverlap | 10 CH Unoverlap |
| C | Somewhat Complex | High | 7 CH Overlap | 6 CH Overlap |
| D | Somewhat Complex | Normal | 7 CH Unoverlap | 6 CH Unoverlap |
| E | Very Complex | High | 5 CH Overlap | 4 CH Overlap |
| F | Very Complex | Normal | 5 CH Unoverlap | 5 CH Unoverlap |

(c-5) The present invention can be applied to various image recorders such as color process scanners and laser printers as well as laser plotters, as long as a photosensitive material is scanned with multibeams.

(c-6) The photosensitive material may be placed on a flat table which is linearly moved by a motor. The main scannings and the subscanning may be attained by moving at least one of the recording head and the photosensitive material.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of recording an image on a photosensitive material through a scan of said photosensitive material with a plurality of modulated photobeams wherein said scan is conducted along a sequence of main scannings, each of said main scannings being conducted with said plurality of modulated photobeams in a main scanning direction, said sequence being directed in a subscanning direction, said method comprising the steps of:
  (a) generating image signals expressing said image for each scanning line,
  (b) modulating a plurality of photobeams with said image signals to generate a plurality of modulated photobeams which form a plurality of photospots substantially aligned on said photosensitive material in said subscanning direction, wherein said plurality of modulated photobeams are classified into front photobeams existing in a side to which subscanning is to be advanced and rear photobeams existing in another side opposite to said side, and
  (c) scanning said photosensitive material with said plurality of modulated photobeams along said sequence of said main scannings while relatively moving said photosensitive material and said plurality of modulated photobeams in said subscanning direction so that scanning lines which are scanned with said front photobeams in a main scanning are positionally alternated with other scanning lines which are scanned with said rear photobeams in another main scanning which follows said main scanning in said sequence.

2. A method of claim 1, wherein difference between respective numbers of said front photobeams and said rear photobeams is minimized.

3. A method of claim 2, wherein said plurality of modulated photobeams are N modulated photobeams forming N photospots, where N is an integer larger than one,
  periodic scanning lines having a line pitch $\Delta L$ are designated on said photosensitive material,
  said method further comprises the step of:
  (e) determining a subscanning pitch $\Delta X$ so as to substantially satisfy the following equation (E1):

$$\Delta X = \Delta L \cdot N \quad (E1)$$

and
  the step (c) includes the step of:
  (c-1) relatively moving said photosensitive material and said plurality of modulated photobeams in said subscanning direction by said subscanning pitch $\Delta X$ for every in scanning in said sequence.

4. A method of claim 3, wherein
  N is an odd integer,
  said difference is one,
  said N photospots are aligned at an alignment pitch substantially equal to $2\Delta L$, and
  said step (e) includes the step of:
  (e-1) determining said subscanning pitch $\Delta X$ so as to substantially satisfy the following equation (E2):

$$\Delta X = P \cdot N/2 \quad (E2)$$

5. A method of claim 3, wherein
  N is an even integer,
  said difference is zero, whereby N/2 front photospots and N/2 rear photospots are formed by said front photobeams and said rear photobeams, respectively, said N/2 front photospots are aligned at an alignment pitch P being substantially equal to $2\Delta L$, said N/2 rear photospots are also aligned at said alignment pitch P,
  a distance between respective centers of two photospots neighboring across a boundary gap between said N/2 front photospots and said N/2 rear photospots is 1.5P, and
  the step (e) includes the step of:
  (e-2) determining said subscanning pitch $\Delta X$ so as to substantially satisfy the following equation (E2):

$$\Delta X = P \cdot N/2 \quad (E2)$$

6. A method of recording an image on a photosensitive material through a scan of said photosensitive material with a plurality of modulated photobeams wherein said scan is conducted along a sequence of main scannings, each of said main scannings being conducted with said plurality of said modulated photobeams in a main scanning direction along periodic scanning lines, said sequence being directed in a subscanning direction, said method comprising the steps of:
  (a) designating a line pitch $\Delta L$ of said periodic scanning lines according to a recording plan of said image, said line pitch $\Delta L$ being one of a fine pitch $\Delta L_1$ and a normal pitch $\Delta L_2$ which are distinguished from each other by an inequality $\Delta L_1 < \Delta L_2$,
  (b) generating image signals expressing said image for each scanning line,
  (c) when said line pitch $\Delta L$ which is designated in the step (a) is said fine pitch $\Delta L_1$, performing the steps of:
  (c-1) modulating N photobeams with said image signals to generate N modulated photobeams which form N photospots substantially aligned on said photosensitive material in said subscanning direction at a pitch larger than said fine pitch $\Delta L_1$, wherein N is an integer larger than one, and said N modulated photobeams are classified into front photobeams existing in a side to which subscanning is to be advanced and rear photobeams existing in another side opposite to said side, and
  (c-2) scanning said photosensitive material with said N modulated photobeams along a first sequence of said main scannings while relatively moving said photosensitive material and said plurality of modulated photobeams in said subscanning direction so that scanning lines which are scanned with said front photobeams in a main scanning are positionally alternated with other scanning lines which are scanned with said rear photobeams in another main scanning which follows said main scanning in said first sequence, and
  (d) when said line pitch $\Delta L$ which is designated in the step (a) is said normal pitch $\Delta L_2$, performing the steps of:
  (d-1) modulating M photobeams which form M photospots substantially aligned on said photosensitive material in said subscanning direction at a pitch corresponding to said normal pitch $\Delta L_2$, wherein M is an integer larger than one, and
  (d-2) scanning said photosensitive material with said M modulated photobeams along a second sequence of main scannings while relatively moving said photosensitive material and said M modulated photobeams in said subscanning direction so that scanning lines which are scanned in a main scanning are followed by other scanning lines which are scanned in another main scanning which follows said main scanning in said second sequence.

7. A method of claim 6, wherein difference between respective numbers of said front photobeams and said rear photobeams is minimized.

8. A method of claim 7, wherein
the step (c) further comprises the step of:
(c-3) determining a subscanning pitch $\Delta X_1$ so as to substantially satisfy the following equation (E1):

$$\Delta X_1 = \Delta L_1 \cdot N \tag{E1}$$

the step (c-2) includes the step of:
(c-21) relatively moving said photosensitive material and said N modulated photobeams in said subscanning direction by said subscanning pitch $\Delta X_1$ for every main scanning in said first sequence,
the step (d) further comprises the step of:
(d-3) determining a subscanning pitch $\Delta X_2$ so as to substantially satisfy the following equation (E2):

$$\Delta X_2 = \Delta L_2 \cdot M \tag{E2}$$

and
the step (d-2) includes the step of:
(d-21) relatively moving said photosensitive material and said M modulated photobeams in said subscanning direction by said subscanning pitch $\Delta X_2$ for every main scanning in said second sequence.

9. A method of claim 8, wherein
N is an odd integer,
said difference is one,
said fine pitch $\Delta L_1$ and said normal pitch $\Delta L_2$ is related to each other through the conditon $\Delta L_2 = 2\Delta L_1$,
said N photospots are aligned at an alignment pitch P being substantially equal to $2\Delta L_1$,
said M photospots are aligned at said alignment pitch P, which is substantially equal to $\Delta L_2$ due to the condition $\Delta L_2 = 2\Delta L_1$,
the step (c-3) includes the step of:
(c-31) determining said subscanning pitch $\Delta X_1$ so as to substantially satisfy the following equation (E3):

$$\Delta X_1 = P \cdot N/2 \tag{E3}$$

and,
the step (d-3) includes the step of:
(d-31) determining said subscanning pitch $\Delta X_2$ so as to substantially satisfy the following equation (E4):

$$\Delta X_2 = P \cdot M \tag{E4}$$

10. A method of claim 9, wherein
the condition N=M is satisfied.
11. A method of claim 9, wherein
M is an odd integer different from N.
12. A method of claim 9, wherein
M is an even integer.
13. A method of claim 8, wherein
N is an even integer,
said difference is zero, whereby N/2 front photospots and N/2 rear photospots are formed by said front photobeams and said rear photobeams, respectively, said fine pitch $\Delta L_1$ and said normal pitch $\Delta L_2$ are related to each other through the condition $2\Delta L_1 = \Delta L_2$,
said N/2 front photospots are aligned at an alignment pitch P being substantially equal to $2\Delta L_1$,
said N/2 rear photospots are also aligned at said alignment pitch P,
a distance between respective centers of two photospots neighboring each other across a boundary gap between said N/2 front photospots and said N/2 rear photospots is 1.5P and P in the steps (c) and (d), respectively,
said M photospots are aligned at said alignment pitch P, which is substantially equal to $\Delta L_2$ due to the condition $2L\Delta_1 = \Delta L_2$,
the step (c-3) includes the step of:
(c-31) determining said subscanning pitch $\Delta X_1$ so as to substantially satisfy the following equation (E3):

$$\Delta X_1 = P \cdot N/2 \tag{E3}$$

and,
the step (d-3) includes the step of:
(d-31) determining said subscanning pitch $\Delta X_2$ so as to substantially satisfy the following equation (E4):

$$\Delta X_2 = P \cdot M \tag{E4}$$

14. A method of claim 13, wherein
the condition N=M is satisfied.
15. A method of claim 13, wherein
M is an even integer different from N.
16. A method of claim 13, wherein
M is an odd integer.
17. An apparatus for recording an image on a photosensitive material by scanning said photosensitive material with photobeams along periodic scanning lines which substantially extend in a main scanning direction Y and are arrayed in a subscanning direction X being substantially perpendicular to said first direction Y, said apparatus comprising:
(a) image signal generating means for generating image singals expressing said image for each scanning line,
(b) beam generating means for generating N photobeams which are modulated by said image signals, wherein N is an integer larger than one, said N photobeams are substantially aligned in said subscanning direction X, and said N photobeams are classified into front photobeams existing in a side to which subscanning is to be advanced and rear photobeams existing in another side opposite to said side,
(c) main scanning means for relatively moving said photosensitive material and said N photobeams in said main scanning direction Y, to perform main scanning of said photosensitive material repeatedly, wherein N scanning lines are scanned in parallel in each main scanning,
(d) subscanning means for relatively moving said photosensitive material and said N photobeams in said subscanning direction X by a given subscanning pitch $\Delta X$ for every main scanning of said photosensitive material to perform subscanning of said photosensitive material, and
(e) pitch signal generating means for generating a first pitch signal indicative of a first subscanning pitch $\Delta X_1$ to deliver said first pitch signal to said subscanning means as said given subscanning pitch $\Delta X$, wherein said first subscanning pitch $\Delta X_1$ is determined so that scanning lines which are scanned with said front photobeams in a first main scanning are alternated with other scanning lines which are scanned with said rear photobeams in a second main scanning which follows said first main scanning in repetition of main scanning.

18. An apparatus of claim 17, wherein
said pitch signal generating means includes:
(e-1) means for generating said first pitch signal expressing said first subscanning pitch $\Delta X_1$,
(e-2) means for generating a second pitch signal expressing a second subscanning pitch $\Delta X_2$ which is substantially twice the first subscanning pitch $\Delta X_1$, and
(e-3) means for enabling one of said means (e-1) and (e-2) in response to a given command.

19. An apparatus of claim 18, further comprising:
(f) means for substantially varying the number N by partially inactivating said N photobeams.

20. An apparatus of claim 19, wherein
N in an odd integer,
said apparatus further comprises:
(g) means for adjusting respective intervals of said N photobeams so that N photospots which are formed on said photosensitive material by said N photobeams are aligned at an alignment pitch P being substantially equal to $2\Delta L$, where $\Delta L$ is a designated pitch at which said parallel scanning lines are arrayed, and
said first subscanning pitch $\Delta X_1$ substantially satisfies the following equation (E1):

$$\Delta X_1 = P \cdot N/2 \tag{E1}$$

21. An apparatus of claim 19, wherein
N is an even integer,
respective numbers of said front photobeams and said rear photobeams are equal to N/2, whereby N/2 front photospots and N/2 rear photospots are formed on said photosensitive material,
said parallel scanning lines are arrayed at a pitch $\Delta L$,
said apparatus further comprises:
(h) mean for adjusting respective intervals of said N photobeams so that said N/2 front photospots are aligned at an alignment pitch P being substantially equal to $2\Delta L$, said N/2 rear photospots are also aligned at said alignment pitch P, and a center-to-center distance between two photospots neighboring each other across a boundary gap between said N/2 front photospots and said N/2 rear photospots is 1.5P, and
said first subscanning pitch $\Delta X_1$ substantially satisfies the following equation (E2):

$$\Delta X_1 = P \cdot N/2 \tag{E2}$$

22. An apparatus of claim 21, wherein
said beam generating means includes:
(b-1) means for generating said front photobeams,
(b-2) means for generating said rear photobeams, and
(b-3) means for aligning said front photobeams and said rear photobeams, and
said means (h) includes:
(h-1) means coupled to said means (b-3) for varying said distance.

23. An apparatus of claim 22, wherein
said distance is set at 1.5 P when said means (e-1) is enabled, and
said distance is set at P when said means (e-2) is enabled.

* * * * *

UNITED STATES PATENT AND TRADEMARK OFFICE
CERTIFICATE OF CORRECTION

PATENT NO. : 4,905,025

DATED : February 27, 1990

INVENTOR(S) : Takashi Sakamoto; Masafumi Kawatani; Kazutaka Tasaka; Masahide Okazaki It is certified that error appears in the above-identified patent and that said Letters Patent is hereby corrected as shown below:

Column 10, line 8, delete "$P = 2\Delta:_1(=D)$" and replace with $$-- P = 2\Delta L_1(=D) --;$$

Column 21, line 41, delete "$\Delta X = \Delta: \cdot N$" and replace with $$-- \Delta X = \Delta L \cdot N --.$$

Signed and Sealed this

Eleventh Day of June, 1991

Attest:

HARRY F. MANBECK, JR.

Attesting Officer

Commissioner of Patents and Trademarks